(12) United States Patent
Knight et al.

(10) Patent No.: US 8,165,848 B2
(45) Date of Patent: Apr. 24, 2012

(54) METHOD OF INSPECTING EQUIPMENT

(75) Inventors: Mark Edward Knight, Lafayette, LA (US); Mickey Paul Broussard, Carencro, LA (US); Adam Duncan Ashe, Greenwell Springs, LA (US)

(73) Assignee: Knight Information Systems, LLC, Lafayette, LA (US)

( * ) Notice: Subject to any disclaimer, the term of this patent is extended or adjusted under 35 U.S.C. 154(b) by 559 days.

(21) Appl. No.: 12/393,300

(22) Filed: Feb. 26, 2009

(65) Prior Publication Data

US 2010/0217554 A1 Aug. 26, 2010

(51) Int. Cl.
*G01M 99/00* (2011.01)
*G01M 13/00* (2006.01)
*G06F 17/40* (2006.01)
*G06F 19/00* (2011.01)
*G99Z 99/00* (2006.01)

(52) U.S. Cl. ........ 702/187; 73/865.8; 73/866.3; 702/34; 702/182; 705/305

(58) Field of Classification Search .............. 73/432.1, 73/865.8, 865.9, 866, 866.3; 702/1, 33, 34, 702/35, 81, 82, 83, 108, 119, 127, 182, 183, 702/187, 189; 705/1.1, 7.11, 7.12, 7.28, 705/7.38, 7.41, 305, 308, 400
See application file for complete search history.

(56) References Cited

U.S. PATENT DOCUMENTS

| | | | | |
|---|---|---|---|---|
| 4,404,639 | A * | 9/1983 | McGuire et al. | 701/35 |
| 4,812,994 | A * | 3/1989 | Taylor et al. | 705/410 |
| 4,967,381 | A * | 10/1990 | Lane et al. | 702/81 |
| 5,142,128 | A | 8/1992 | Perkin et al. | |
| 5,360,967 | A | 11/1994 | Perkin et al. | |
| 5,399,844 | A | 3/1995 | Holland | |
| 5,657,233 | A * | 8/1997 | Cherrington et al. | 705/400 |
| 5,717,595 | A * | 2/1998 | Cherrington et al. | 705/400 |
| 5,724,261 | A * | 3/1998 | Denny et al. | 702/184 |
| 6,070,155 | A * | 5/2000 | Cherrington et al. | 705/400 |
| 6,347,292 | B1 | 2/2002 | Denny et al. | |
| 6,397,131 | B1 * | 5/2002 | Busch et al. | 701/29 |
| 6,480,811 | B2 | 11/2002 | Denny et al. | |
| 6,604,063 | B2 | 8/2003 | Denny et al. | |
| 6,826,492 | B2 | 11/2004 | Newman | |
| 6,973,416 | B2 | 12/2005 | Denny et al. | |
| 7,062,413 | B2 | 6/2006 | Denny et al. | |
| 7,362,229 | B2 | 4/2008 | Brinton et al. | |
| 2002/0158120 | A1 | 10/2002 | Zierolf | |
| 2004/0078306 | A1 | 4/2004 | Whiteley et al. | |
| 2005/0131596 | A1 * | 6/2005 | Cherrington et al. | 701/29 |
| 2007/0124220 | A1 | 5/2007 | Griggs et al. | |

* cited by examiner

*Primary Examiner* — Edward Cosimano
(74) *Attorney, Agent, or Firm* — Jones Walker

(57) ABSTRACT

A method of inspecting equipment to ensure quality control that employs a computer program to assist in the inspection. The program contains an inspection protocol adapted to specific equipment. The inspector follows the protocol to inspect component parts of the equipment. The inspection protocol can only be closed, indicating completion of the inspection, when the protocol has been followed. The program is capable of generating a variety of inspection reports.

19 Claims, 23 Drawing Sheets

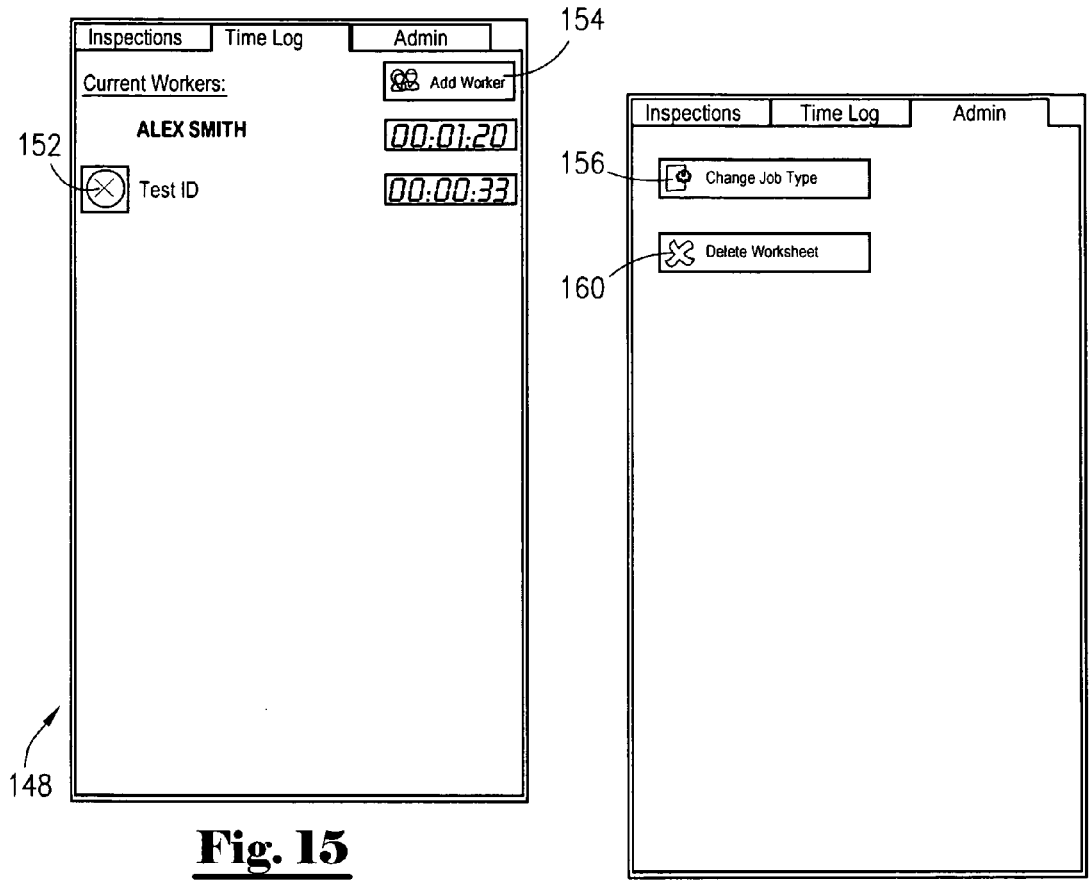
Fig. 15
Fig. 16
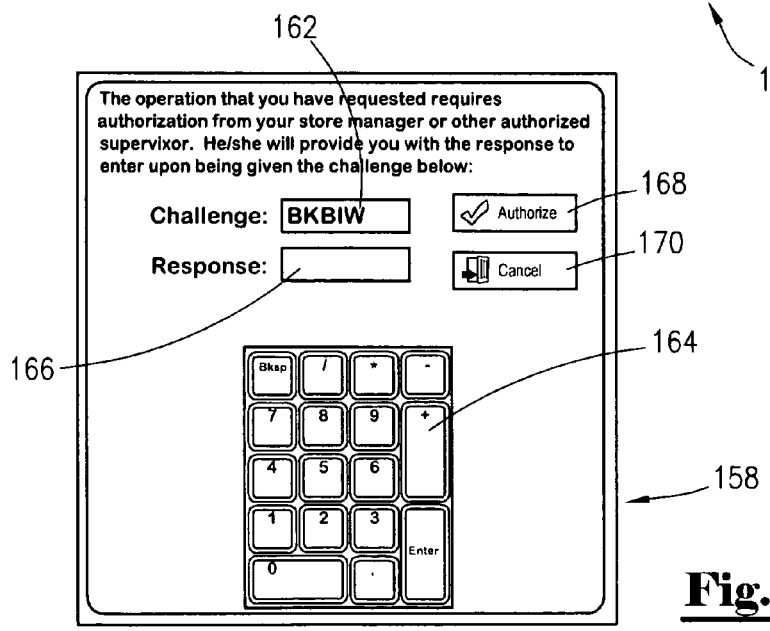
Fig. 17

Fig. 18

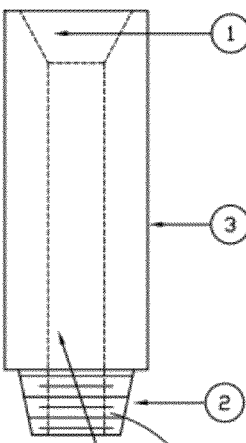

INSPECTION REPORT

REPORT CRITERIA:  DT NUMBER: 2126121  Report Date 9/8/2008 2:05:38 PM

| Date/Insp# | Serial# | Description | DT No. | BOX Connection | BOX Feat. | BOX Insp. | PIN Connection | PIN Feat. | PIN Insp. | ID Pin | OD Pin | OD BOX | Cent. Pad | Length | Visual | Mech/Dim | Wet Mag | Dry Meg | Ultra Son | Drift | Other |
|---|---|---|---|---|---|---|---|---|---|---|---|---|---|---|---|---|---|---|---|---|---|
| 3/24/2008 101449 | KP40721 | SPIRAL WATE DRILL PIPE, 4" OD WXT 39 CONNS | | XT-39 | NONE | OK | XT-39 | NONE | OK | 4 28/32 | | 4 28/32 | | 31.16 | * | * | * | * | | | |
| 3/24/2008 101450 | KP40712 | SPIRAL WATE DRILL PIPE, 4" OD WXT 39 CONNS | | XT-39 | NONE | OK | XT-39 | NONE | OK | 4 28/32 | | 4 28/32 | | 31.12 | * | * | * | * | | | |
| 3/24/2008 101451 | KP40710 | SPIRAL WATE DRILL PIPE, 4" OD WXT 39 CONNS | | XT-39 | NONE | OK | XT-39 | NONE | OK | 4 28/32 | | 4 28/32 | | 31.2 | | | | | | | |
| 3/24/2008 101452 | KP40711 | SPIRAL WATE DRILL PIPE, 4" OD WXT 39 CONNS | | XT-39 | NONE | OK | XT-39 | NONE | OK | 4 28/32 | | 4 28/32 | | 31.13 | * | * | * | * | | | |
| 3/24/2008 101454 | KP40714 | SPIRAL WATE DRILL PIPE, 4" OD WXT 39 CONNS | | XT-39 | NONE | OK | XT-39 | NONE | OK | 4 28/32 | | 4 28/32 | | 31.15 | * | * | * | * | | | |
| 3/24/2008 101455 | KP40722 | SPIRAL WATE DRILL PIPE, 4" OD WXT 39 CONNS | | XT-39 | NONE | OK | XT-39 | NONE | OK | 4 28/32 | | 4 28/32 | | 31.12 | * | * | * | * | | | |
| 3/24/2008 101456 | KP40723 | SPIRAL WATE DRILL PIPE, 4" OD WXT 39 CONNS | | XT-39 | NONE | OK | XT-39 | NONE | OK | 4 28/32 | | 4 28/32 | | 31.12 | * | * | * | * | | | |
| 3/24/2008 101457 | KP40725 | SPIRAL WATE DRILL PIPE, 4" OD WXT 39 CONNS | | XT-39 | NONE | OK | XT-39 | NONE | OK | 4 28/32 | | 4 28/32 | | 31.13 | * | * | * | * | | | |
| 3/24/2008 101458 | KP40726 | SPIRAL WATE DRILL PIPE, 4" OD WXT 39 CONNS | | XT-39 | NONE | OK | XT-39 | NONE | OK | 4 28/32 | | 4 28/32 | | 31.09 | * | * | * | * | | | |
| 3/24/2008 101459 | KP40709 | SPIRAL WATE DRILL PIPE, 4" OD WXT 39 CONNS | | XT-39 | NONE | OK | XT-39 | NONE | OK | 4 28/32 | | 4 28/32 | | 31.1 | * | * | * | * | | | |
| 3/24/2008 101453 | KP40713 | SPIRAL WATE DRILL PIPE, 4" OD WXT 39 CONNS | | XT-39 | NONE | OK | XT-39 | NONE | OK | 4 28/32 | | 4 28/32 | | 31.15 | * | * | * | * | * | | |
| 3/24/2008 101274 | KP40760 | SPIRAL WATE DRILL PIPE, 4" OD WXT 39 CONNS | | XT-39 | NONE | OK | XT-39 | NONE | OK | 4 28/32 | | 4 28/32 | | 31.16 | * | * | * | * | * | | |
| 3/24/2008 101275 | KP40761 | SPIRAL WATE DRILL PIPE, 4" OD WXT 39 CONNS | | XT-39 | NONE | OK | XT-39 | NONE | OK | 4 28/32 | | 4 28/32 | | 31.17 | * | * | * | * | * | | |
| 3/24/2008 101276 | KP40762 | SPIRAL WATE DRILL PIPE, 4" OD WXT 39 CONNS | | XT-39 | NONE | OK | XT-39 | NONE | OK | 4 28/32 | | 4 28/32 | | 31.15 | * | * | * | * | * | | |
| 3/24/2008 101277 | KP40763 | SPIRAL WATE DRILL PIPE, 4" OD WXT 39 CONNS | | XT-39 | NONE | OK | XT-39 | NONE | OK | 4 28/32 | | 4 28/32 | | 31.13 | * | * | * | * | * | | |
| 3/24/2008 101249 | KP40736 | SPIRAL WATE DRILL PIPE, 4" OD WXT 39 CONNS | | XT-39 | NONE | OK | XT-39 | NONE | OK | 4 28/32 | | 4 28/32 | | 31.12 | * | * | * | * | * | | |

NOTE: Defects located marked on equipment as follows:  CRACKS - RED PAINT  OTHER DEFECTS - YELLOW PAINT

LEGEND:  BB - BORE BACK  RG - RELIEF GROOVE

Damage Report

| | |
|---|---|
| D.T. Number: 2126102 | Date Shipped: 3/22/2008 |
| P.O. Number: | Date Returned: 5/16/2008 |
| Ordered by: Mr. Joe Smith | Ship To: WATER WATER DOCK |
| Customer: 051235 | Lease: EZ DRILLING |
| Acme Tools | Well Number: #1 |
| xxx E. Road | OCSG Number: JOE JOE FIELD |
| Houston, Tx 77060 | Rig Number: OIL #88 |

| Item | Description | StartRent | StoptRent | Inspection# |
|---|---|---|---|---|
| K550426 | SPIRAL WARE DRILL PIPE, 5" OD W/4-1/2" IF 1560# W/BORE BACK BOX & STD PIN W/PROTS. | 3/22/2008 | 2/27/2008 | 101997 |

© DAMAGES (INSPECTION COMPLETE)
| Inspection | Item | Damages |
|---|---|---|
| No Damages Found | | |

| KP501253 | SPIRAL WATE DRILL PIPE, 5" OD W/4-1/2" IF 1550# W/PROTS. | 3/22/2008 | 3/27/2008 | 102000 |

⚠ DAMAGES (INSPECTION COMPLETE)
| Inspection | Item | Damages |
|---|---|---|
| 4/11/2008 | Pin Inspection | Failed: Damaged Shoulder |

| KS50439 | SPIRAL WATE DRILL PIPE, 5" OD W/4-1/2" IF 1550# W/BORE BACK BOX & STD PIN W/RUSTGUARD APPLIED ON ALL CONNS. W/PROTS. | 3/22/2008 | 3/27/2008 | 102105 |

⚠ DAMAGES (INSPECTION COMPLETE)
| Inspection | Item | Damages |
|---|---|---|
| 4/17/2008 | Pin Inspection | Failed: Refaced -OK |

| KS50584 | SPIRAL WATE DRILL PIPE, 5" OD W/4-1/2" IF 1550# W/PROTS. | 3/22/2008 | 3/27/2008 | 101926 |

© DAMAGES (INSPECTION COMPLETE)
| Inspection | Item | Damages |
|---|---|---|
| No Damages Found | | |

| KS50525 | SPIRAL WATE DRILL PIPE, 5" OD W/4-1/2" IF 1550# W/PROTS. | 3/22/2008 | 3/27/2008 | 102098 |

⚠ DAMAGES (INSPECTION COMPLETE)
| Inspection | Item | Damages |
|---|---|---|
| 4/17/2008 | Box Inspection | Failed: Damaged Shoulder |

| KS50525 | SPIRAL WATE DRILL PIPE, 5" OD W/4-1/2" IF 1550# W/PROTS. | 3/22/2008 | 3/27/2008 | 101875 |

⚠ DAMAGES (INSPECTION COMPLETE)
| Inspection | Item | Damages |
|---|---|---|
| 4/17/2008 | Box Inspection | Failed: Damaged Shoulder |

| KS50335 | SPIRAL WATE DRILL PIPE, 5" OD W/4-1/2" IF 1550# W/BORE BOX & SR PIN W/PROTS. | 3/22/2008 | 3/27/2008 | N/A |

Damage Report -DT# 2125102                                   Page 1 of 7

Fig. 29

Labor Report

| | | | |
|---|---|---|---|
| Inspection Number: | 128084 | Serial Number: | K-47398 |
| Start Date: | 2/6/2009 3:35:05 PM | Part Description: | Elevator Myt 40 ton 1"-2-7/8" |
| End Date: | 2/12/2009 1:49:57 PM | Inspected by: | ALEX SMITH |
| Inspection Type: | Rework | Total Time: | 29 |

Employee Detail

| Start Time | Stop Time | Time Worked (minutes) |
|---|---|---|
| ALEX SMITH | | |
| 2/6/2009 3:35:08 PM | 2/6/2009 3:37:08 PM | 2 |
| | | Total: 2 |
| 2/7/2009 8:54:34 AM | 2/7/2009 9:07:34 AM | 13 |
| 2/12/2009 1:25:33 PM | 2/12/2009 1:39:33 PM | 14 |
| 2/12/2009 1:49:31 PM | 2/12/2009 1:49:31 PM | 0 |
| | | Total: 27 |

Fig. 30

METHOD OF INSPECTING EQUIPMENT

FIELD OF THE INVENTION

The present invention relates to a method of inspecting equipment, and more particularly, to a computerized method of inspecting equipment that ensures quality control.

BACKGROUND OF THE INVENTION

Specialized tools and equipment are used in the exploration and production of oil and gas. These tools and equipment are built to withstand ordinary wear and tear they will encounter in the extreme environments and applications in which they will be used. For example, hinged elevators repeatedly open and close around heavy weighted drill pipe to support the pipe segment while it is affixed to a drill pipe strand. The elevator is subjected to continuous wear forces caused by its hydraulic manipulation and by the extreme force placed upon the elevator when supporting drill pipe. Overtime the wear forces applied to the elevator would eventually lead to structural failure. Failure of the elevator could lead to suspended drill pipe being dropped on a rig floor. Costly equipment could be damaged. Rig workers could be injured.

The elevator is one example of a tool used on a rig. Many other tools and equipment are used. Each is critical to the operation. And its failure may lead to catastrophic property damage and personal injury. For these reasons, oil and gas tools and equipment are routinely inspected for wear. Take the elevator for example. After a predetermined time in operation on a drilling rig, the elevator is taken out of service and returned to the rental tool company. The company will have a trained inspector disassemble the elevator and visually inspect each component part. The inspector will determine which component parts contain sufficient wear that their replacement is necessary. The inspector may replace or have the part repaired. The tool is reassembled and ready for shipment back to a rig for further use.

The inspector is fallible. He may not inspect all component parts. He may confuse the tool with another and apply different inspection criteria to the tool that are not applicable. The inspection may be interrupted. When he resumes the inspection several hours or a day later, he may not remember where to begin. Component parts may be missed. Many times inspections are started by one inspector and completed by another. When this happens, there is propensity to overlook parts, thinking the other inspector was responsible for the part's inspection. Finally, the inspector may pass a tool that he did not fully inspect.

There is a need for an inspection method that overcomes the drawbacks associated with prior inspection techniques.

SUMMARY OF THE INVENTION

It is an object of the present invention to provide a method of inspecting equipment that ensures the correct piece of equipment is identified for inspection.

It is a further object of the present invention to provide a method of inspecting equipment that ensures that inspectors inspect the same components for each piece of equipment.

It is an object of the present invention to provide a method of inspecting equipment that ensures that specific wear is inspected for each piece of equipment.

It is a further object of the present invention to provide a method of inspecting equipment that ensures that all component parts of the piece of equipment are inspected.

It is a further object of the present invention to provide a method of inspecting equipment that ensures that correct replacement parts are used.

It is a further object of the present invention to provide a method of inspecting equipment that tracks inspections and inspectors.

It is a further object of the present invention to provide a method of inspecting equipment that compiles a database and generates a variety of reports.

These and other objects and advantages are achieved by the novel method of inspecting equipment to ensure quality control. The method includes providing a piece of equipment in need of inspection. The method involves logging into a computer program. The program assists in the inspection of the equipment. The method includes entering an identification data associated with the equipment into the program and displaying on a display screen an inspection protocol adapted to the equipment. The identification data may be a serial number associated with the equipment. The method comprises carrying out the inspection of the equipment by following the inspection protocol. The method then includes closing the inspection protocol upon completion of the inspection. The inspection protocol is prevented from closing unless the inspection protocol has been followed in it entirety.

The inspection protocol may comprise a graphical representation of the equipment and an inspection protocol screen. The graphical representation of the equipment may include a schematic or diagram of the equipment. The schematic or diagram may be an exploded view of the equipment. The exploded view may show all component parts of the equipment.

The inspection protocol screen may comprise a plurality of component inspection protocols. Each component inspection protocol may correspond to a specific component part of the equipment depicted in the schematic or diagram. Each of the component inspection protocols may have a plurality of inspection states corresponding to a status of the inspection. The plurality of inspection states may include a state indicating that the component part has not been inspected, a state indicating that the component part has passed inspection, a state indicating that the component part has failed inspection, a state indicating that inspection of the component part is not applicable, and a state indicating that the component part must be replaced. Each inspection state may have an associated color to signify the inspection state. Each of the component inspection protocols may be displayed in the color of the then-current inspection state of the component part. Each component part of the equipment depicted in the schematic or diagram may also be displayed in the color of its corresponding component inspection protocol.

The display screen may be part of a computer monitor. The display screen may also be part of a hand-held device. The display screen may be a touch-screen.

The program may be stored on a network server. The display screen may be part of a computer that is networked to the server.

The equipment may be a tool used in the exploration or production of a hydrocarbon.

The method may further include accessing the program to display on the display screen resource data. The resource data may be technical information about the equipment, procedures for inspecting the equipment, or an inspection training video.

In an alternative embodiment, the method of the present invention may include providing a piece of equipment in need of an inspection. The method may also include logging into a computer program from a computer having a touch-screen display. The program assists in the inspection of the equipment. The method involves entering an identification data associated with the equipment into the program and displaying on the touch-screen display an inspection protocol adapted to the equipment. The method includes carrying out the inspection of the equipment by following the inspection protocol. The method comprises closing the inspection protocol upon completion of the inspection. The inspection protocol is prevented from closing unless the inspection protocol has been followed in it entirety. The last step is printing an inspection label upon the closing of the inspection protocol and associating the inspection label with the inspected equipment.

The alternative method may also include the steps of carrying out repeated inspections of a plurality of equipment as described above, generating a database based on a plurality of inspection data compiled from the inspection of the plurality of equipment, and generating a report based on the database. Access to the report may be restricted to an authorized person. The reports may be an inspection report, a damage report, a labor report, a system statistic report, a parts usage report, or a trend failure report.

The method of the present invention employs a computer system and program that includes a touch-screen computer application that permits inspectors to retrieve technical data, review reference materials, and record tool inspection results directly on the shop floor while performing inspections. The method ensures that all inspectors inspect the same tool components. The interactive schematic diagram means that inspectors mark damages on the proper tool component. The method requires that all tool components must be inspected and the results recorded before an inspection may be closed out. The method and system supports multiple languages, which permits inspectors to work in their most comfortable language.

The computer interface simplifies recording and reporting. This leads to a consistent work environment from inspector-to-inspector and job-to-job. Inspections are color coded for quick reference and simplicity. Components colored green means that the components have passed inspection. Components colored yellow means that the components must be replaced on each inspection. Uncolored components means that the components must be inspected before the system will allow the inspection to be closed. Red colored components means that the components have failed inspection and must be repaired or replaced.

The method and system has training videos available on-screen for a visual reference during and inspection. Additional technical reference materials are available on tools and components. These materials may be provided by the tool's manufacturer or from the rental company. Also, standard operating procedures may be available on-screen for reference and review. Part numbers are also available on-screen when a replacement part is needed. This ensures that the inspector places the correct replacement part in the tool.

The method and system provide for accountability and tracking. The method and system tracks which inspector or inspectors inspected each tool or tool part. Drill stem inspections are also tracked and wear patterns assembled in a database. For tubular inspections, the method and system also tracks measurement data, thread inspections and refacing. The method integrates with out-sourced inspections (e.g., tubular inspections) so that the inspection may not be closed until both the out-sourced and internal inspections are completed.

The method and system is able to identify and display trends such as those components with high replacement rates.

The method and system also generates an inspection label for each tool. The label signifies that a tool is ready for rental and use. The label is only capable of printing when the inspection has been completed in accordance with the inspection criteria of the method and system.

BRIEF DESCRIPTION OF THE DRAWINGS

FIG. 15 is an embodiment of the time log tab of the inspection interface screen of the computer program.

FIG. 16 is an embodiment of the admin tab of the inspection interface screen of the computer program.

FIG. 17 is an embodiment of the manager authorization required screen of the computer program.

FIG. 18 is an alternative embodiment of the inspection interface screen of the computer program.

FIG. 26 is an embodiment of a manager authorization card report generated by the computer program.

FIG. 27 is an embodiment of an inspection report generated by the computer program.

FIG. 28 is an embodiment of an inspection report—datasheet view generated by the computer program.

FIG. 29 is an embodiment of a damage report generated by the computer program.

FIG. 30 is an embodiment of a labor report generated by the computer program.

DETAILED DESCRIPTION OF PREFERRED EMBODIMENTS

Figure 1:
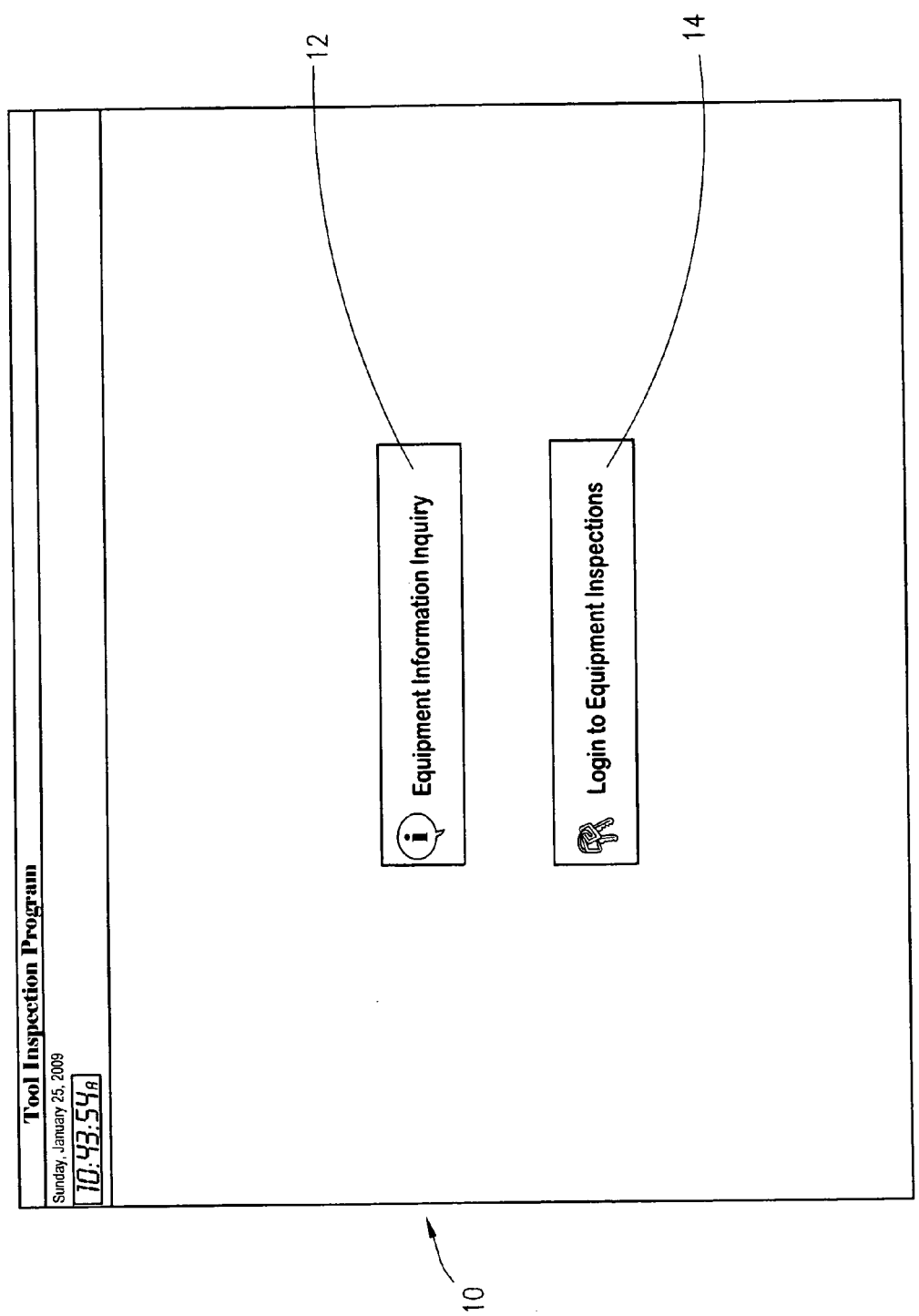
FIG. 1 is an embodiment of the entry screen of the computer program employed as part of the method of the present invention.

The description of the preferred embodiment of the present invention makes reference to a method of using a computer program to inspect oil field tools and equipment. But, it is to be understood that the method and program may be used to inspect any industrial tools and equipment and are not limited to applications involving oil and gas industry tools and equipment. With reference to the figures where like elements have been given like numerical designation to facilitate an understanding of the present invention, and with reference to FIG. 1, the method of the present invention uses a computer program, system or application that contains entry screen 10. Screen 10 serves as the entry point to the computer program's touch-screen interface and is the initial screen shown when the program is launched. The program also returns to entry screen 10 if there is no activity for a set timeout interval. Entry screen 10 includes equipment information inquiry button 12 and login to equipment inspections button 14. By clicking on equipment information button 12, a user (e.g., inspector, administrator, shop worker) begins the process of locating and reviewing technical and business related information about a particular part in inventory. The user need not be logged into the program to gain access to the technical and business information. By clicking on login to equipment inspections button 14, an inspector or user engages the process of logging into the program to access and use the areas of the program that require the user to be authenticated.

Figure 2:
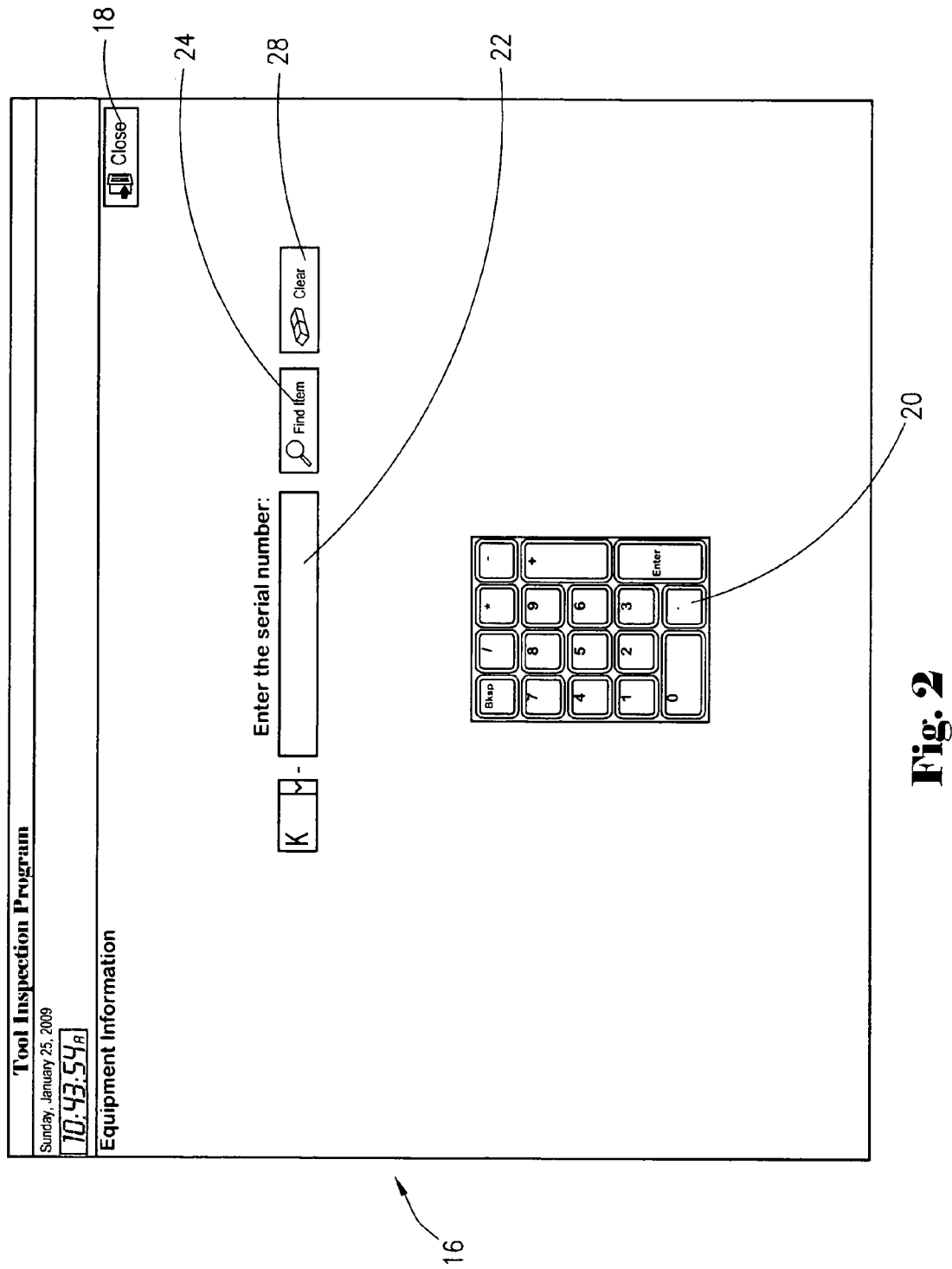
FIG. 2 is an embodiment of the equipment information inquiry screen of the computer program.

With reference to FIG. 2, the program displays equipment information inquiry screen 16 as a result of the user clicking on equipment information inquiry button 12. Equipment information inquiry screen 16 permits the user to search for a particular item or part by serial number and view the information related to the item or part. For example, a shop worker may obtain technical information such as sizes, tolerances, item numbers, view inspection procedures or watch a training video from any computer terminal. Inquiry screen 16 includes close button 18. By clicking on close button 18, the user returns the terminal display to entry screen 10. Inquiry screen 16 also includes number pad 20. Number pad 20 may be an on-screen touchpad. The user may enter a serial number for an item or part the user wishes to search. Any input entered into number pad 20 is displayed in text box 22. Inquiry screen 16 includes find item button 24. Find item button 24 may be used (by clicking on button 24) to search an inventory of items or parts maintained in the program. If the item or part is not found within the inventory, the program displays to the user that the item or part was not found. If an item or part was located, the program will display item information screen 26. Clear button 28 may be used (by clicking thereon) to reset the interface to permit the user to begin a new search for an item or part.

Figure 3:
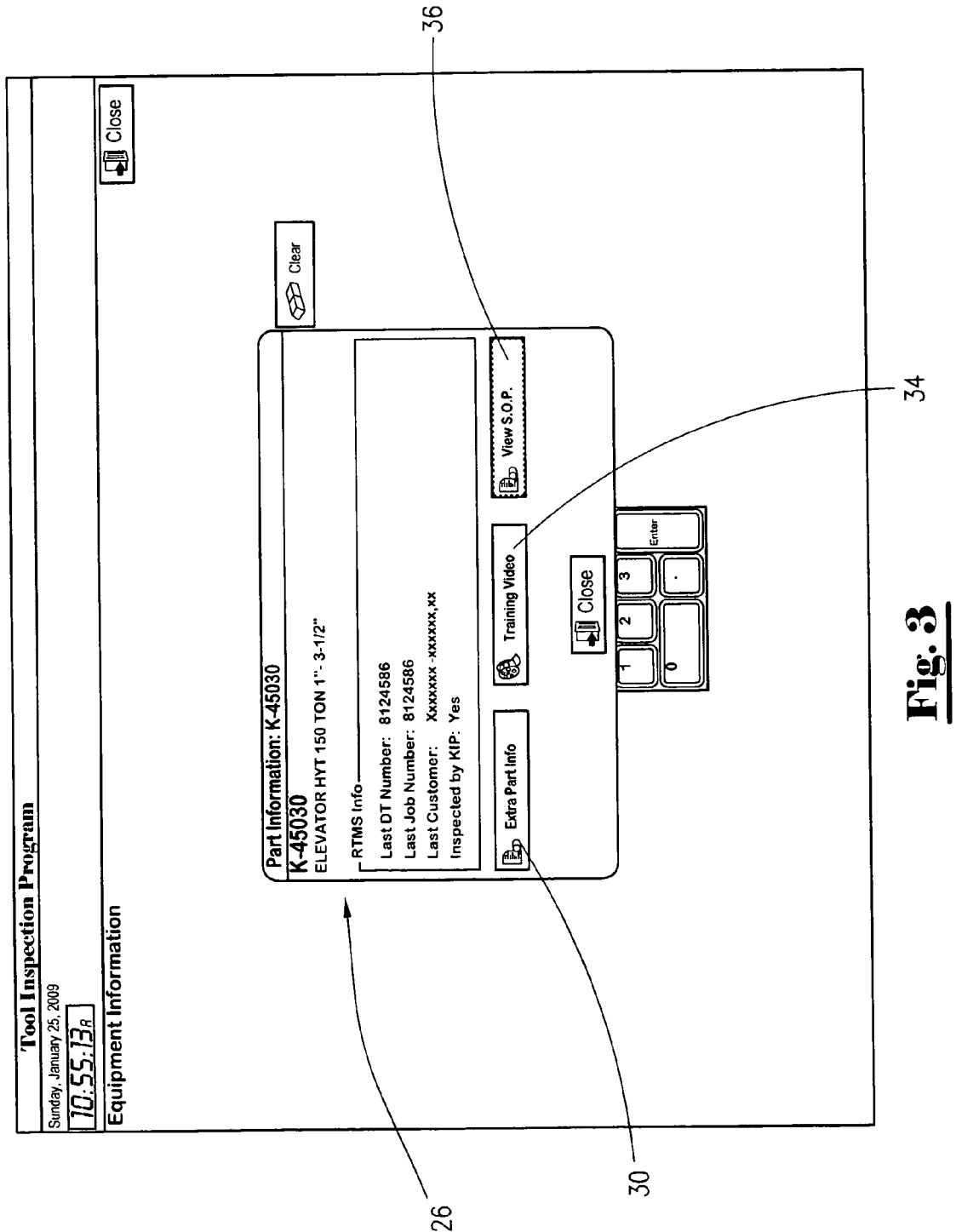
FIG. 3 is an embodiment of the item information screen of the computer program.

FIG. 3 shows item information screen 26. Item information screen 26 provides the user with specific information on an item or part such as technical information. The technical information may consist of manufacturer information, schematics, item details, construction plans, fabrication specifications, weights and measures. The technical information may also include training information such as videos on how to properly inspect or repair the item or part, standard inspections procedures and checklists. Screen 26 includes extra part info button 30. Button 30, when clicked, permits the user to view technical data associated with the item or part. Technical data may consist of manufacturer information, diagrams, instructions, reorder information and the like. Activation of button 30 may cause the program to display any information prepared by the administrator into a document format. To view the technical data, the user clicks on button 30 which causes the program to display document viewer screen 32. If no document has been assigned to the particular item or part, button 30 is disabled and the user is so informed via screen display. Screen 26 includes training video button 34. By clicking on button 34, the user is able to access any training video material associated with the item or part. The training videos may consist of videos designed to instruct the user on how to inspect the item or part, specified portions of the item or part, or administrator inspection procedures in general. If no training video is available, button 34 is disabled and the user so notified via screen 26. Screen 26 also includes view S.O.P. button 36. Button 36, when activated, allows the user to view any standard operating procedures as supplied by the administrator for the item or part. The document is displayed via document viewer screen 32, which is launched when the user clicks on button 36.

Figure 4:
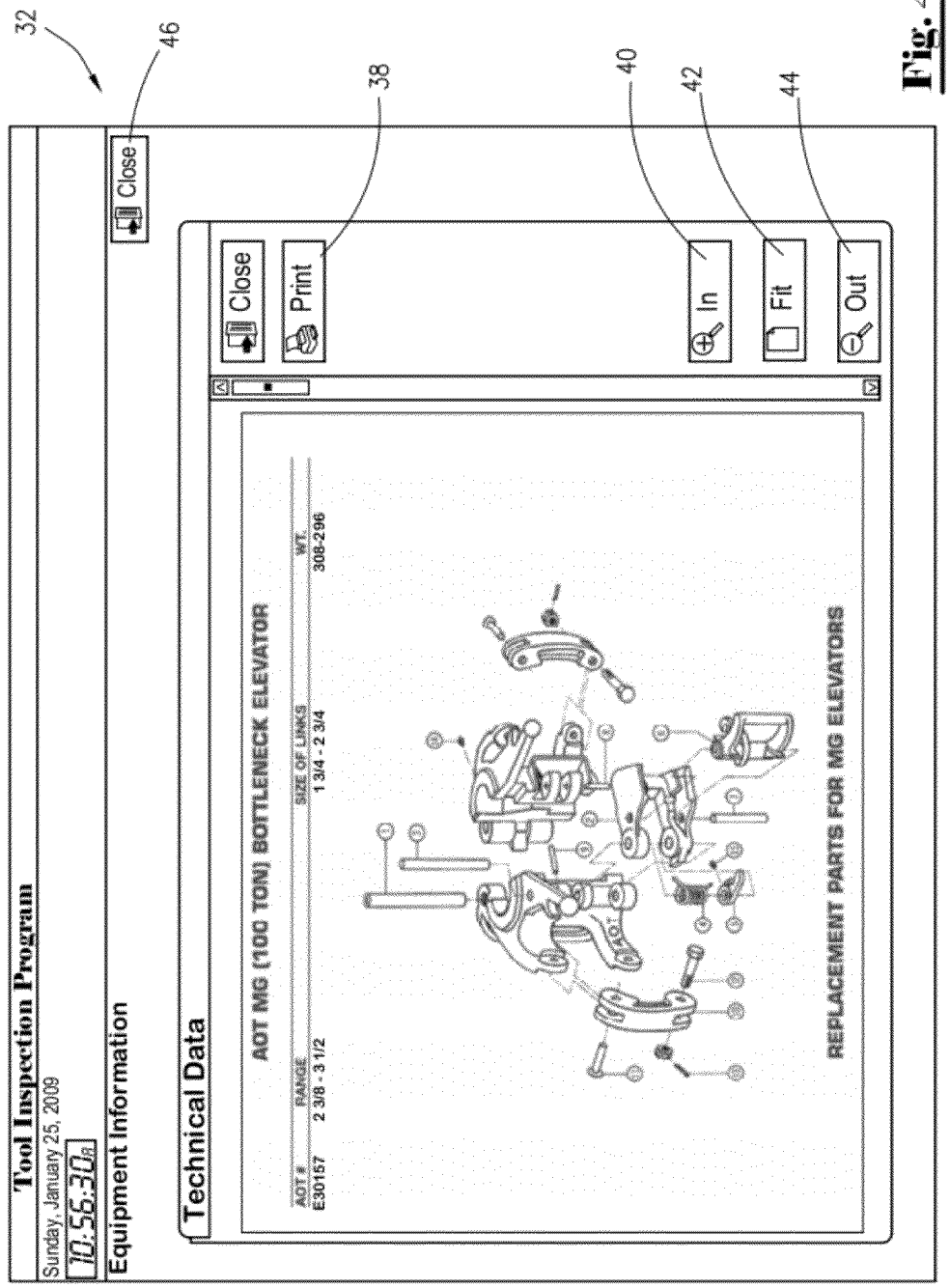
FIG. 4 is an embodiment of the document viewer screen of the computer program.

With reference to FIG. 4, document viewer screen 32 displays any document as defined by the administrator. Such documents could be in various formats such as Adobe Acrobat® portable document format (pdf) or any other format type that the computer is able to display. Screen 32 may include print button 38, in situations where the computer is connected to a printer. By clicking on button 38, the user will cause the program to print the viewed document for reading off-screen. The user may desire to print the viewed document for reference when the user is away from the computer screen or for any number of reasons. Screen 32 includes in button 40, fit button 42, and out button 44. Buttons 40, 42, 44 cause the viewed document to be displayed in various different views. Clicking on button 40 causes the display of the viewed document to zoom in for a close-up view of a portion of the viewed document. Clicking on button 44 causes the display of the viewed document to zoom out for a wide-angle view of the document. Clicking on fit button 42 causes the display of the viewed document to fit the computer screen. Screen 32 may also contain close button 46. Clicking on close button 46 will close the viewed document and return to user to the previous screen display.

Figure 5:
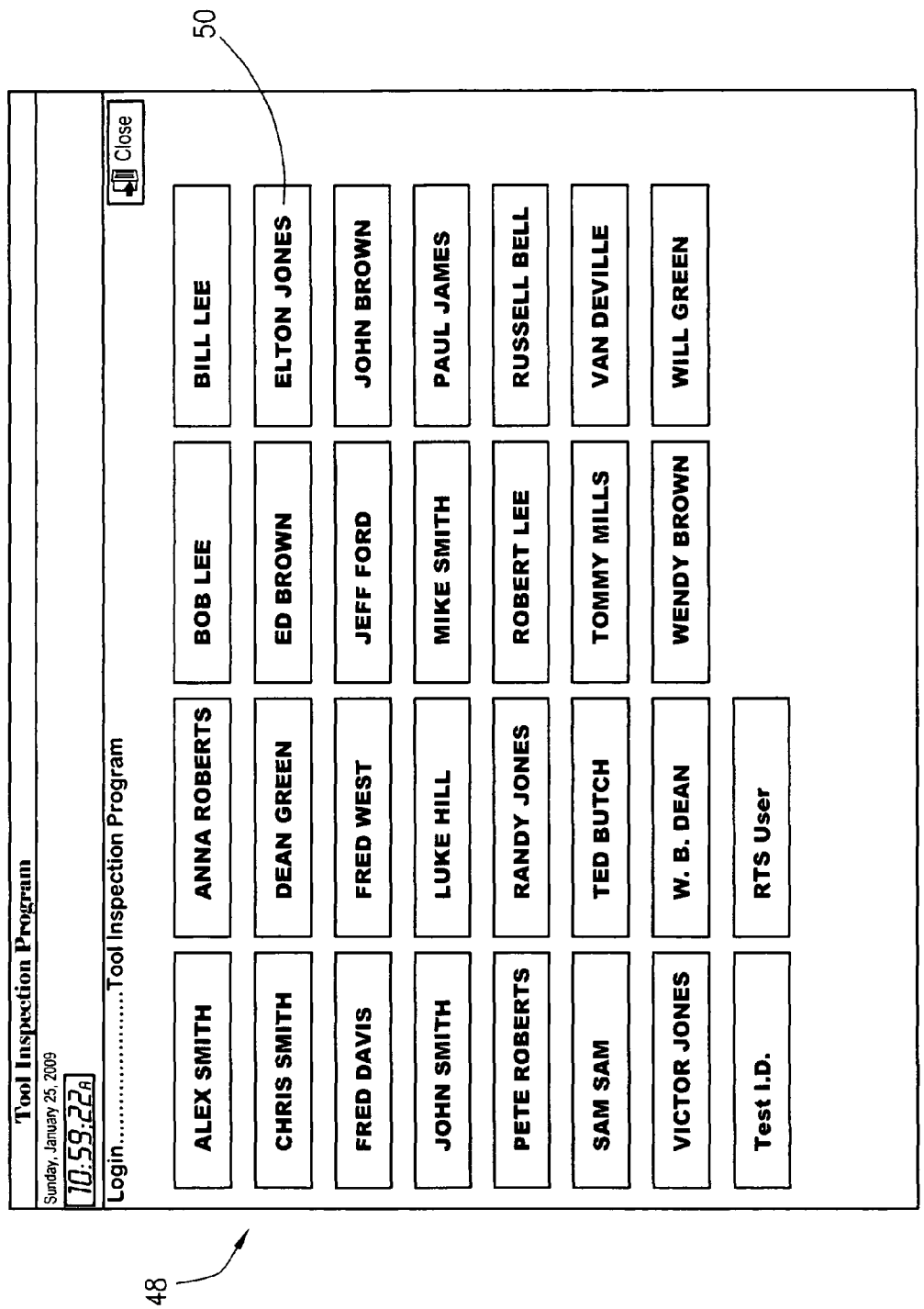
FIG. 5 is an embodiment of the user login screen of the computer program.

FIG. 5 illustrates user login screen 48. User login screen 48 is displayed after a user clicks on login to equipment inspections button 14. Screen 48 permits users to login into the tool inspection application of the computer program. Users listed on screen 48 may be specific to the location where the touch-screen computer is operating. Users are obtained via any standard user authentication system and may be stored in a database, XML file, enterprise-level directory (e.g., Active Directory commercially available from Microsoft Corporation), or other storage mechanism. The storage mechanism is responsible for assigning users to a particular location. Screen 48 contains one or more user-specific buttons 50. The number of buttons 50 depends on the number of authorized users. When the user selects his or her name from the list of users displayed on screen 48 by clicking on the appropriate button 50, the user will be presented with password entry screen 52.

Figure 6:
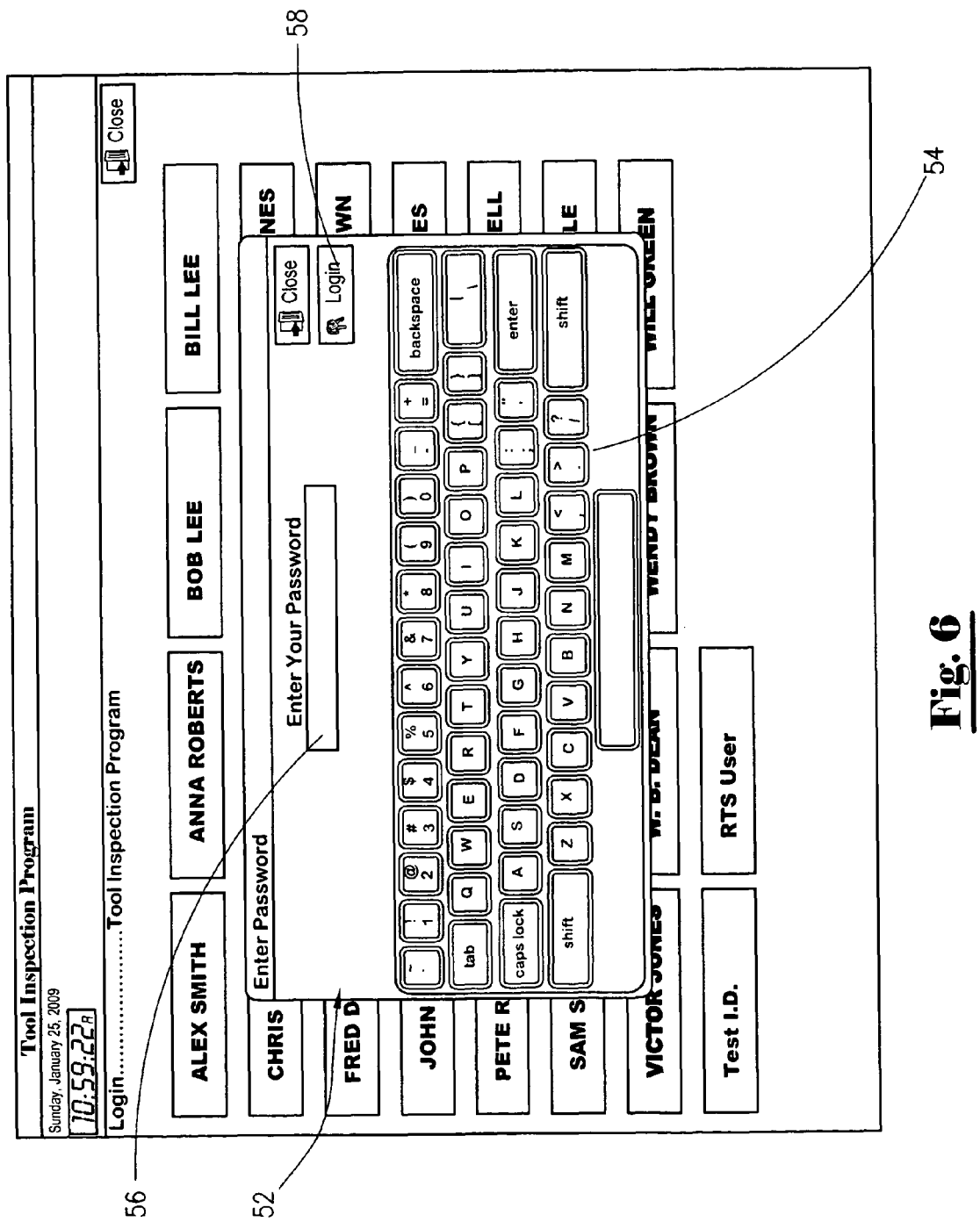
FIG. 6 is an embodiment of the password entry screen of the computer program.

As show in FIG. 6, password entry screen 52 permits the user to enter any standard password (alphanumeric characters) via an on-screen keyboard 54. When inputted with a password and activated, screen 52 allows the configured security system (as described above) to attempt to validate that the entered password matches the username previously selected. On-screen keyboard 54 functions similar to a physical keyboard. Any keys tapped on keyboard 54 are entered into password entry box 56. The actual text will not be displayed to the user but represented by an asterisk (*) to hide the password so that others near the computer screen do not see the user's password. Login button 58 is clicked after the password is inputted. Button 58 will attempt to cause the program to validate the user's password. An incorrect password message will be displayed on-screen to inform the user that the password is incorrect or not valid. Another attempt may be made by the user to input the correct password. The incorrect password message may also notify the user to input his or her password again. If the password is validated, the user is logged into the tool inspection application. If the user's password is set to expire within a short period of time, the program will display password change screen 60.

Figure 7:
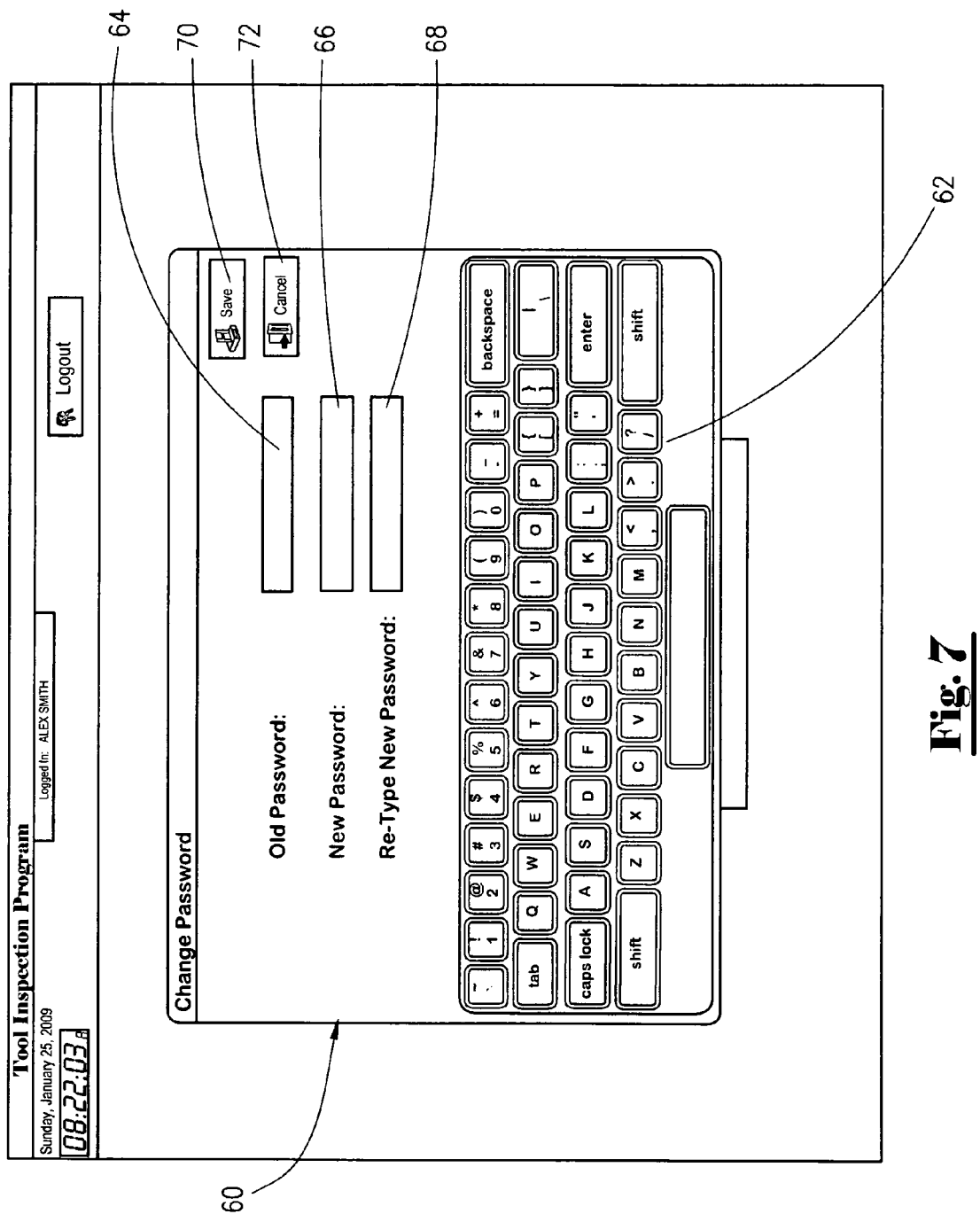
FIG. 7 is an embodiment of the password change screen of the computer program.

FIG. 7 shows password change screen 60. Screen 60 permits the user to change his or her password with the security system. Screen 60 includes on-screen keyboard 62. The user uses keyboard 62 to input his or her current password, the user's new password, and confirms the new password. The user's current password will be displayed in current password box 64. The user's new password will be displayed in new password box 66. The user's confirmed new password will be displayed in confirmed new password box 68. For security reasons, the current, new, and confirmed new passwords may be displayed as an asterisk (*). Screen 60 includes save button 70. By clicking button 70, the program will validate that the user has correctly entered his current, new, and confirmed passwords. If any are incorrect, the program will display an error message on-screen. If correct, the user's password is changed via the authentication system being used and the application returns to the previous screen. Screen 60 also includes cancel button 72. Activation of button 72 will close screen 60 without making any password changes.

Figure 8:
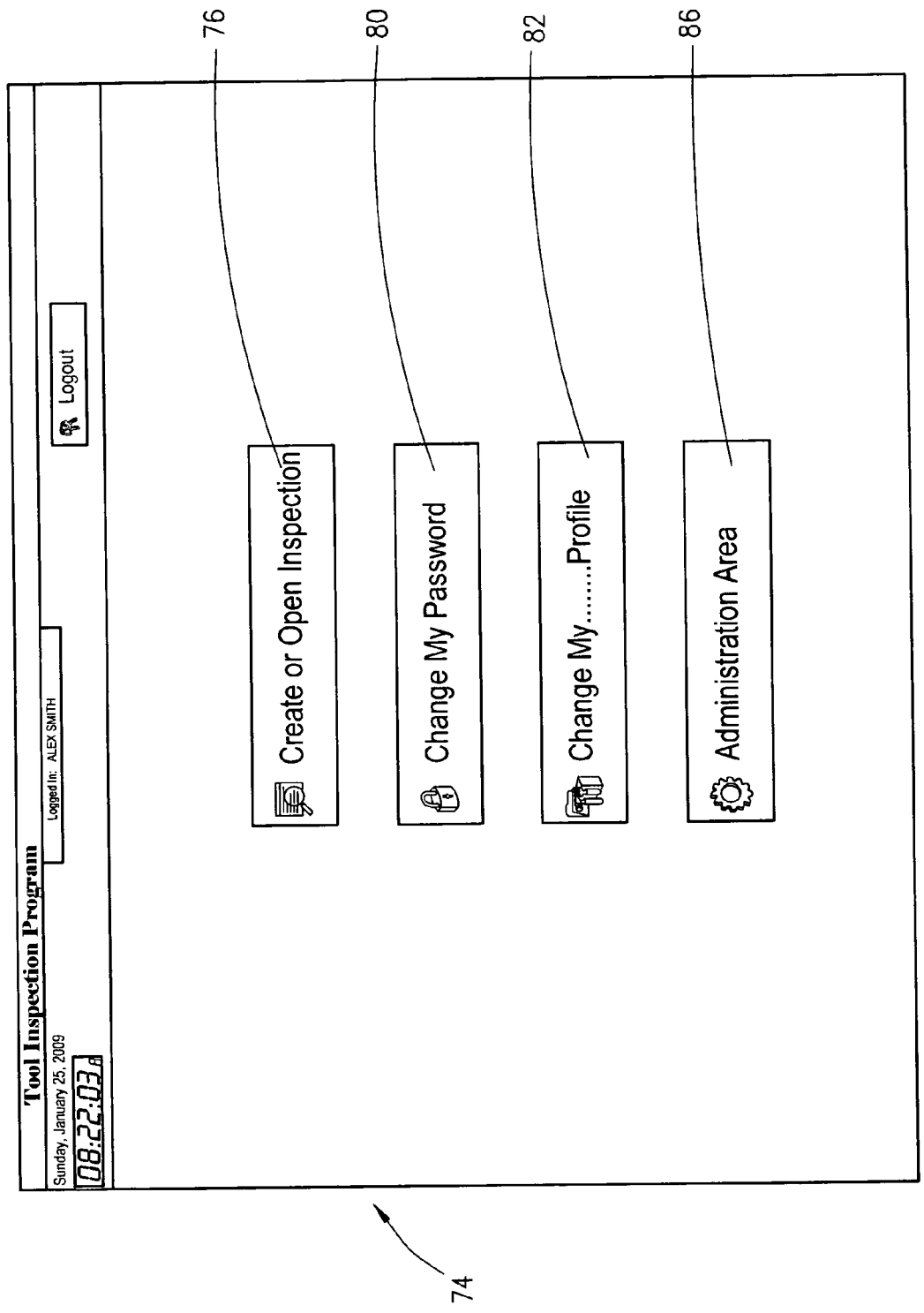
FIG. 8 is an embodiment of the inspection home screen of the computer program.

With reference to FIG. 8, inspection home screen 74 is displayed on-screen when the user has successfully logged into the tool inspection application. Screen 74 is the main navigation point for users whenever they have logged into the tool inspection application of the program. Navigation buttons described below permit access to the "secured" portions of the application. Screen 74 includes create or open inspection button 76. Button 76, when clicked, begins the process of initiating a new inspection or opening an inspection that was previously started but not competed. Clicking button 76 will open and display inspection screen 78. Screen 74 includes change my password button 80. Clicking on button 80 launches and displays password change screen 60, which will permit the user to change his or her password as described above. Screen 74 contains change my profile button 82. By clicking on button 82, edit my profile screen 84 launches and is displayed, which permits the user to customize his or her preferences for the application. Screen 74 also includes administration area button 86. Button 86 is only shown on computers of persons having sufficient security credentials (e.g., a manager) who is authorized to have access to perform supervisory actions.

Figure 9:
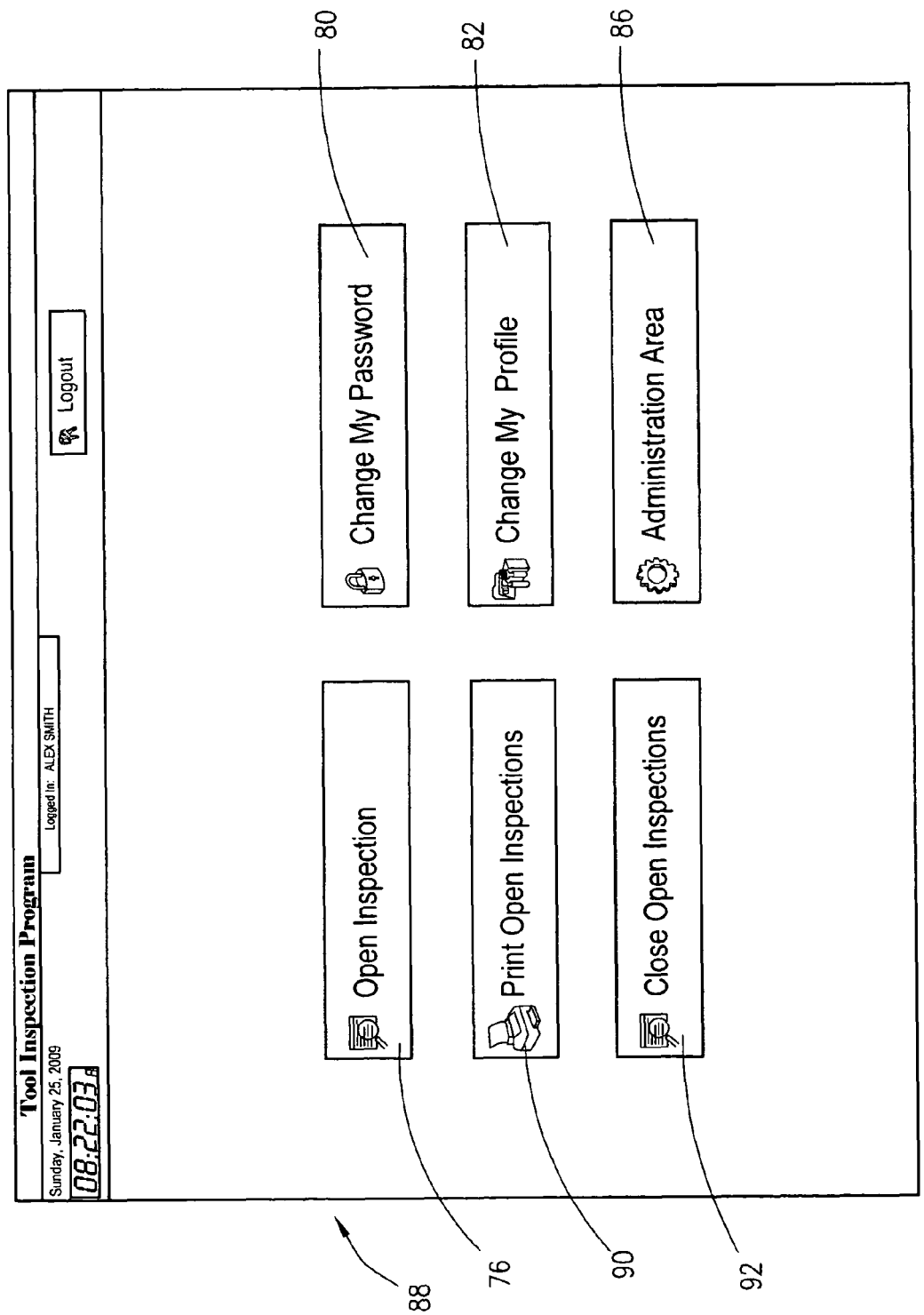
FIG. 9 is an alternative embodiment of the inspection home screen of the computer program.

FIG. 9 shows an alternative inspection home screen 88. Screen 88 contains buttons 76, 80, 82, 86 which also appeared on screen 74. Screen 88 contains additional buttons such as print open inspection button 90 and close open inspection button 92. Different inspection home screens may be configured for use with different administrators, companies, or inspection departments within administrators or companies. Screens 74 and 88 represent two choices. Activating button 90 will cause the program to print a report of all inspections which the current user has open. Clicking button 90 will send an open inspection report to the configured printer. Button 92, when activated, closes out all of the user's currently-opened inspections which have all their information filled in, i.e., the inspection are completed and in a state where closure is possible.

Figure 10:
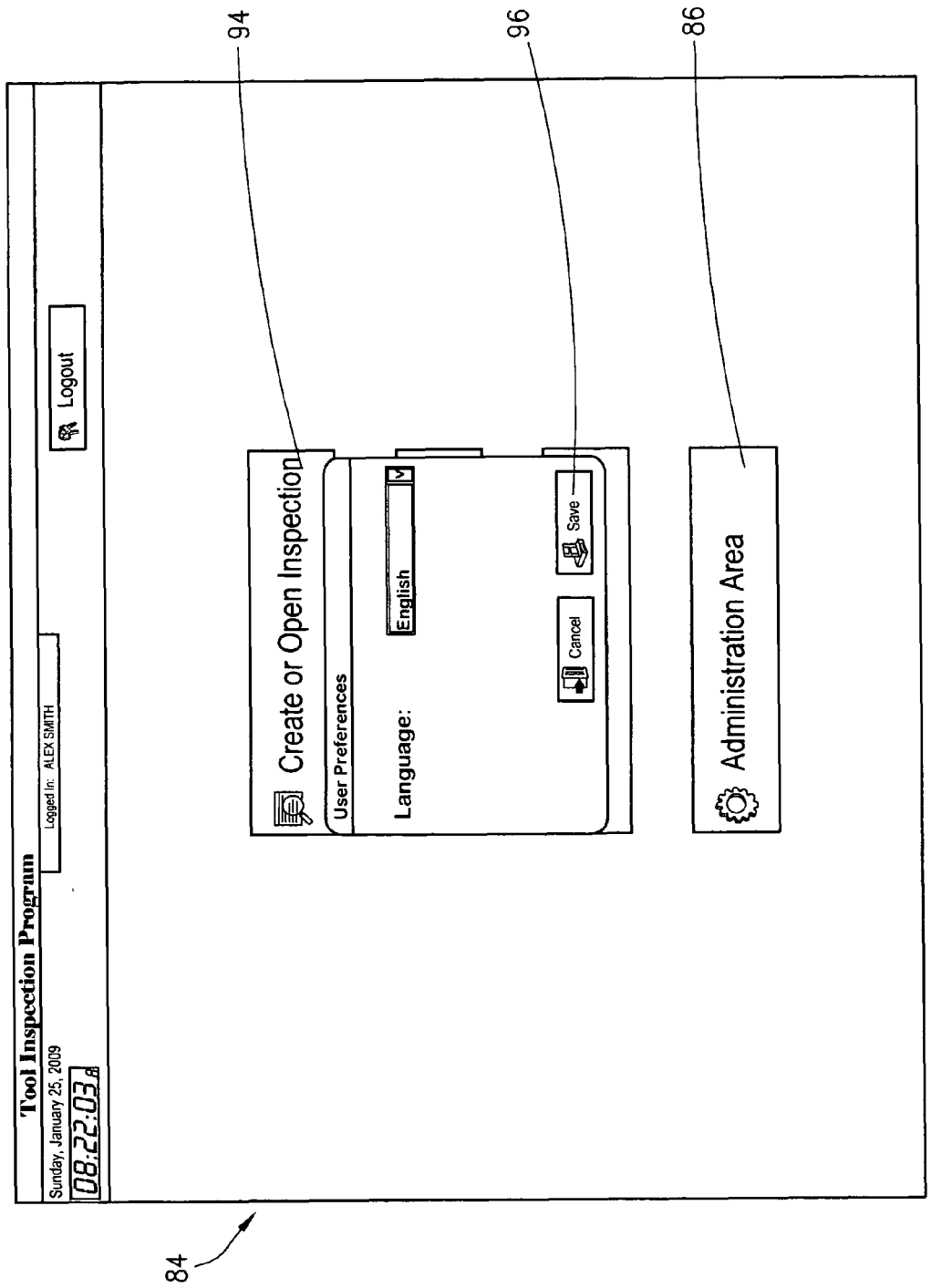
FIG. 10 is an embodiment of the change my profile screen of the computer program.

Edit my profile screen 84 is shown in FIG. 10. Screen 84 allows the user to customize his or her experience while using the application. Numerous customizations can be made using screen 84. For example, the display language may be selected, printer preference chosen, font sizes and the like. The administrator may configure which settings the user is permitted to customize. Screen 84 includes option selection box 94. Box 94 may be presented to the user in the form of a drop down list, checkboxes, radio buttons and other user interface elements. The user would select which option (e.g., English language) the user wishes to use as part of the application. Save button 96 may be clicked to write all of the selected options to the user's profile. Any new settings will be immediately applied to the application interface.

Figure 11:
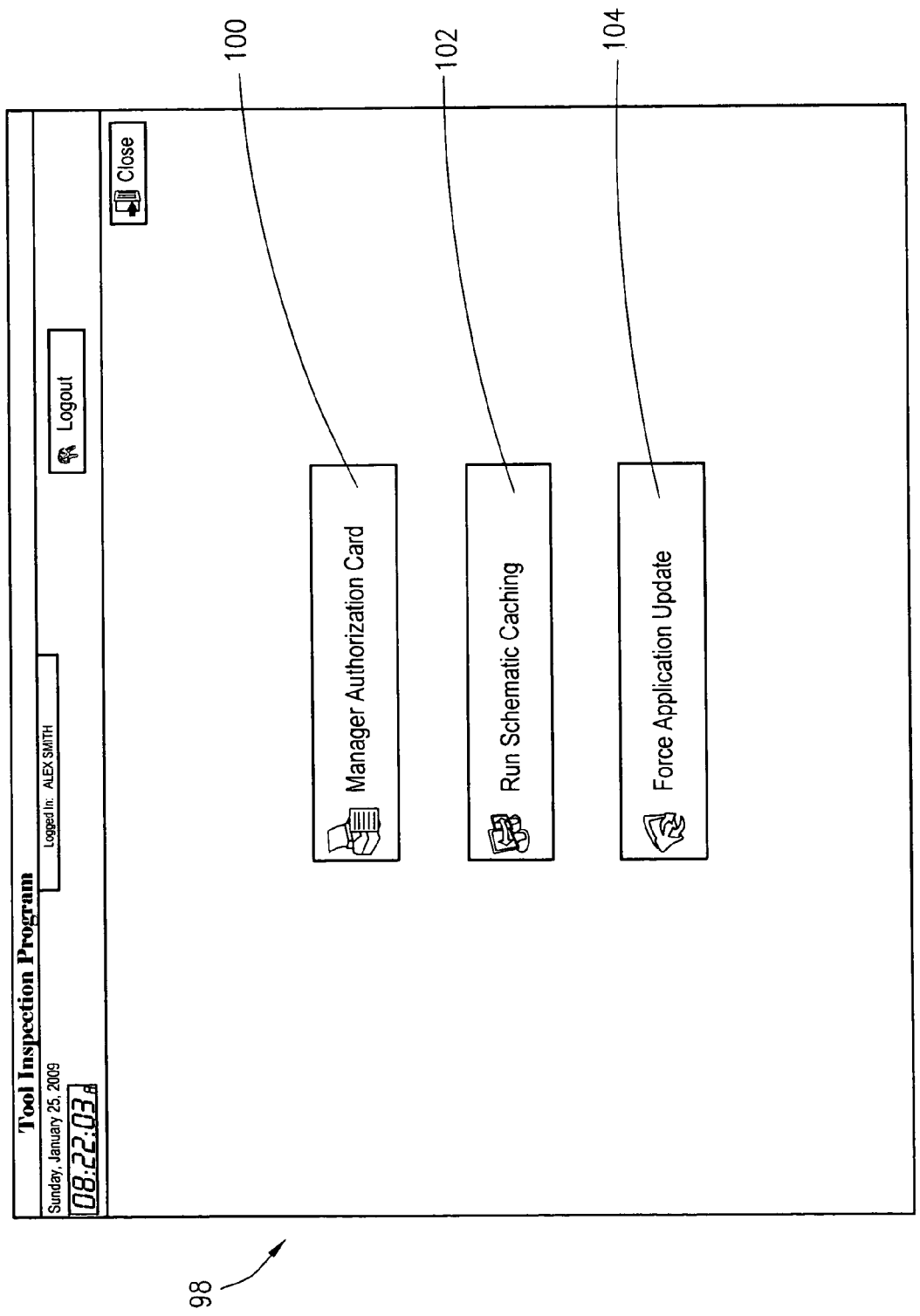
FIG. 11 is an embodiment of the administration screen of the computer program.

Referencing FIG. 11, administration screen 98 is launched and displayed when administration area button 86 is clicked. Screen 98 permits authorized personnel access to administrative functions of the computer program. The user must he allowed, via the security system, access to screen 98. Screen 98 provides various administrative functions such as printing authorization cards or computer-level functions like launching an application update or caching of inspection schematics. The view and use of the buttons on screen 98 may be limited by the security system so, for example, only some administrative users see certain buttons/functions. Screen 98 contains manager authorization card button 100. Button 100 may be clicked to print out manager authorization card label or report 288 to a configured label printer. An example of report 288 is shown in FIG. 26. Report 288 allows a supervisor to authorize a less privileged user to execute a supervisory function. Report 288 contains a set of challenges and responses. Whenever a user of the system needs to perform a supervisory function and has been granted such privileges, the user will be presented with a manager authorization screen. The user will provide the challenge to the supervisor, who will use report 288 to read off the appropriate response. The response, when typed into the system, will allow the user to execute the function. This feature is described below in more detail. Screen 98 also contains run schematic caching button 102. Button 102 will execute a schematic caching operation when activated. This operation runs in the background and will not block a user's access to the program or the tool inspection application thereof Button 102 functions to copy item or part schematics from a central repository, which allows the computer to open schematics from its own storage instead of the central repository opening the schematic. This speeds up the creation and loading of inspections. Button 102 and its features may be turned off by the administrator. Screen 98 includes force application update button 104. Clicking button 104 will force the application to update itself to the latest version, even if the application is already up-to-date. This feature downloads an update immediately rather than waiting for routinely scheduled update. It ensures that the computer has the latest version of the program. The download of the latest software version runs in the background so users may continue to work in the application until the download is complete.

Figure 12:
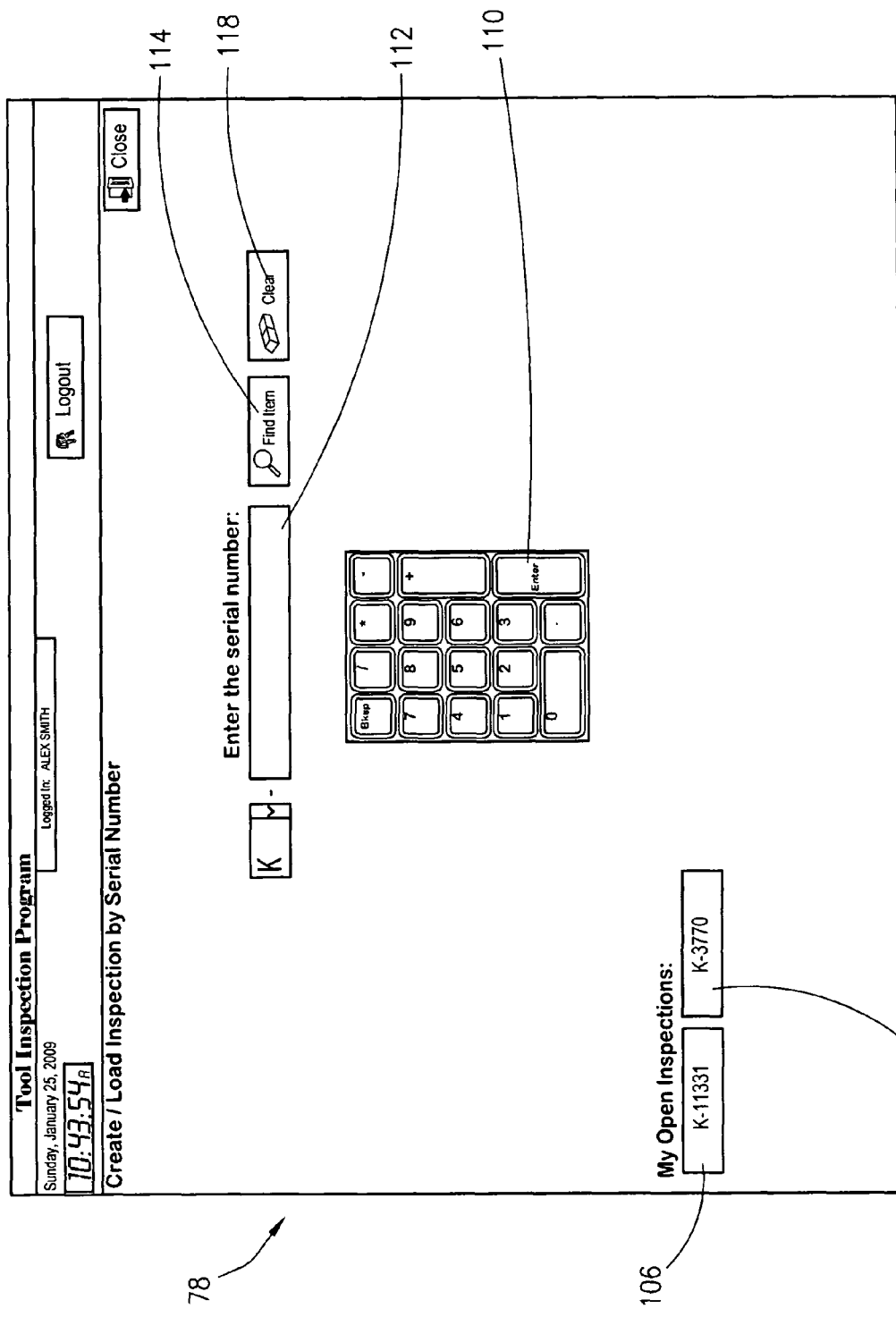
FIG. 12 is an embodiment of the inspection equipment selection screen of the computer program.

FIG. 12 shows inspection screen 78 that is displayed when button 76 on inspection home screen 74 or 88 is activated. Screen 78 permits the user to search for the item or part the user wants to inspect via the application. Screen 78 will either begin a new inspection or pull up a saved inspection that is still in progress and not completed. Screen 78 contains my open inspection button 106. One or more button 106 may appear. Any item inspection that was opened by the user and still in progress will be shown in button 106 (one button 106 per item). The item number for the matter will be shown in button 106. By clicking on button 106, the user will cause the program to open the inspection in inspection interface screen 108. Screen 78 also contains numerical keypad 110. Keypad 110 functions to permit the user to enter numbers into serial number search box 112. Clicking on the numbers via keypad 110 displays the numbers in box 112. Find item button 114, when clicked, will cause the program to attempt to find the item by serial number that the user entered. If the item is not found, the program will inform the user (by on-screen display) and permit another search. If the item is located but has an open inspection already associated with the item, the program will prompt the user and allow the opening of the on-going inspection by launching and displaying inspection interface screen 108. If the item is found and no open inspection is indicated, the program presents the user with a choice of inspection types to perform via select inspection type screen 116. Screen 78 includes clear button 118. Clicking on button 118 will reset the item number search interface to permit the user to begin a new search for an item.

Figure 13:
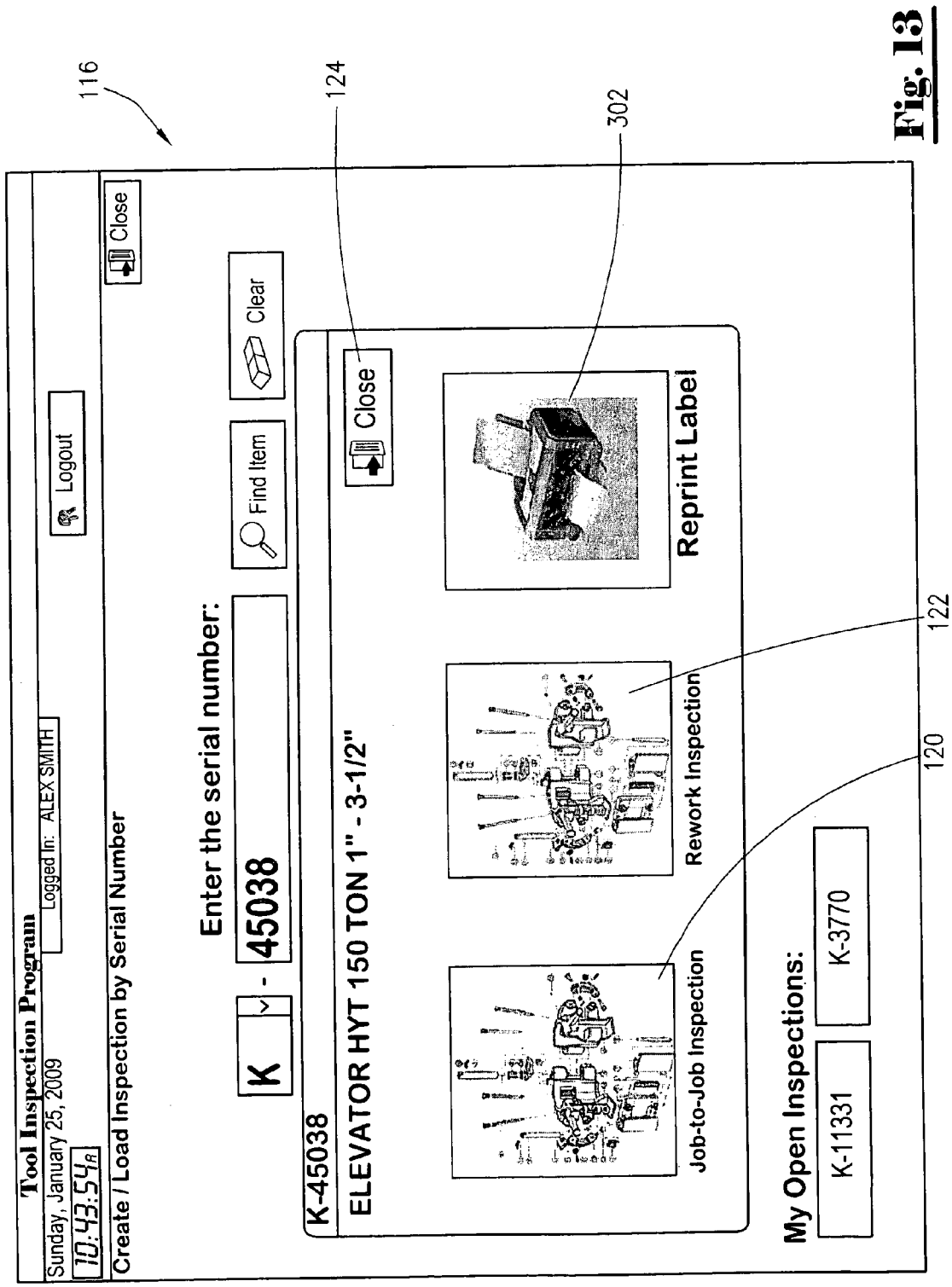
FIG. 13 is an embodiment of the inspection type screen of the computer program.

FIG. 13 illustrates inspection type selection screen 116. Screen 16 functions to allow the user to select an option for creating an inspection for an item. For example, item schematics may be configured to permit a basic or advanced/complete inspection. The names for these types of inspections may be configured by the administrator such as "Job-to-Job" and "Rework." Screen 116 also functions to allow the user to reprint inspection label 284 (shown in FIG. 25) indicating that an inspection was done for the last completed inspection. Label 284 is printed by clicking reprint label button 302. Thumbnails on the buttons used with screen 116 may show the schematics used for the inspection. Job-to-Job inspection button 120, when clicked, will create a basic inspection for the selected and shown item and launch inspection interface screen 108 for this inspection. Rework inspection button 122, when clicked, will create an advanced/complete inspection for the selected and shown item and launch inspection interface screen 108 for this inspection. By clicking on close button 124, the program will cancel the process of creating a new inspection and return the user to the previous screen.

Figure 14:
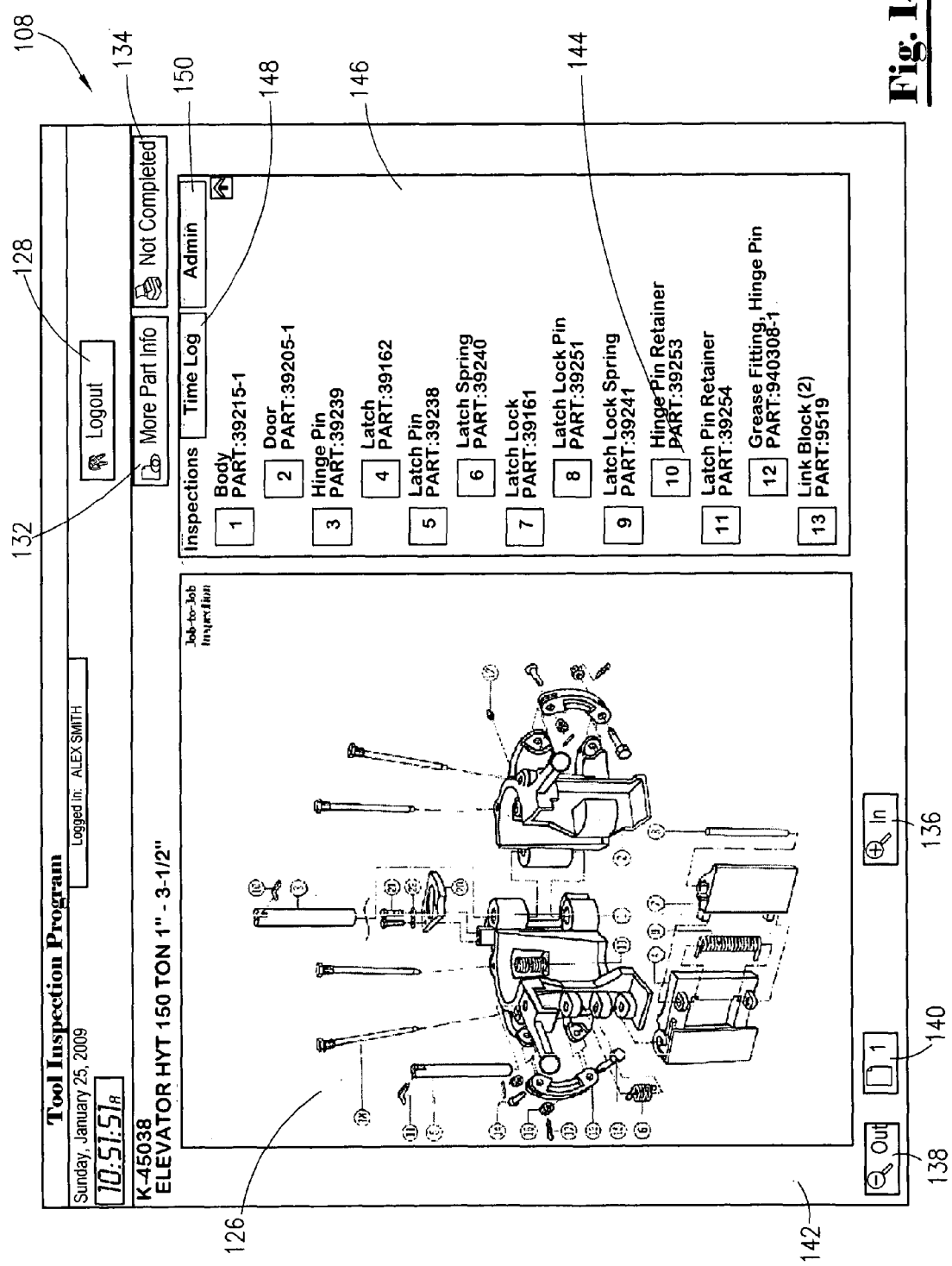
FIG. 14 is an embodiment of the inspection interface screen of the computer program.
Figure 25:
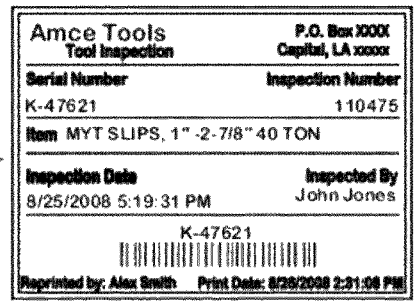
FIG. 25 is an embodiment of an inspection label generated by the computer program.

With reference to FIG. 14, inspection interface screen 108 is the primary screen used for performing inspections on tools. Screen 108 displays item schematic 126. Schematic 126 may contain diagrams and schematics specific to the item being inspected as well as each sub-assembly or component part that must be inspected for the selected item and inspection type. Screen 108 contains logout button 128. Logout button 128 functions to close the user's current inspection (which is saved and may be later resumed) and to permit the user to logout of the system or return to inspection home screen 74, 88. The selection to logout or return to inspection home screen 74, 88 is done via logout options screen 130. More part info button 132, when clicked, will display item information screen 26 loaded with the current item's part information. Close and print button 134, when activated, permits the user to complete the inspection by closing it out and printing inspection label 284 indicating successful completion of the inspection. Button 134 has at least three possible states. The first is "Not Completed" where the user has not inspected every required sub-assembly on the tool. In this state, button 134 is disabled to prevent the user from closing the inspection and shows a text indicated Not Completed. The second state is "Waiting on RTS" where the user has completed all of his or her inspections, but the tool must be further inspected by another person, company or department. In this state, button 134 is disabled and reads Waiting on RTS (RTS is used as an example to indicate a company or department the tool is waiting on for inspection). The third state is "Close & Print" where all sub-assembly inspections have been completed, including any other person, company or department's inspection, if necessary. Button 134 will read close and print and permit the user to click. When clicked in the close and print state, the program will complete the item's inspection by closing it out and recording the user who closed the inspection, the date of closure, and the time of closure. Inspection label 284 as shown in FIG. 25 will then be generated and output to the label printer configured for the computer. The program then returns the user to inspection home screen 74, 88.

Again with reference to FIG. 14, in-zoom button 136 and out-zoom button 138 function to allow the user to change his or her view of item schematic 126 shown in the display. With each click, item schematic 126 shown in the display will zoom in or out by a factor configured by the administrator depending on which button 136 or 138 is clicked. Page number button 140 contains the appropriate page number for item schematic 126. Clicking button 140 will show the user the specific page of item schematic 126 as well as zoom the view out to show the entire page in the schematic view area. There may be multiple button 140 instances, one per page of the schematic 126. Schematic view 142 enables the user to pan the view of item schematic 126 by pressing and moving his or her finger within schematic view 142. By doing so, the user may zoom in and move item schematic 126 to a desired area of the schematic for viewing. Each sub-assembly or component part of item schematic 126 is numbered or otherwise designated. Screen 108 includes sub-assembly buttons 144 corresponding to a particular sub-assembly. Each button 144 is labeled with its sub-assembly number or designation with the sub-assembly description and part number displayed adjacent thereto. Buttons 144 are shown in inspection sub-assembly list 146 which may appear on the right side of the computer screen. Each button 144 may have at least five possible states that correspond to the inspection status of the particular sub-assembly represented by button 144.

Silver/Not—Inspected in this state button 144 is designated as not inspected (e.g., given a specific color such as silver) to show that the user has not inspected the sub-assembly Green/Inspection Ok—in this state button 144 is designated inspection ok (e.g., given a specific color such as green) to show that the user has inspected the sub-assembly and that it cleared the inspection Red/Failed Inspection—in this state button 144 is designated as a failed inspection (e.g., given a specific color such as red) to show that the user has inspected the sub-assembly and that it failed inspection Dark Grey/Not Applicable—in this state button 144 is designated as not applicable (e.g., given a specific color such as dark grey) to show that the item or tool does not have the sub-assembly or that an inspection of the sub-assembly is not required (e.g., when a tool contains an optional component that may or may not be present)

Yellow/Auto Replace—in this state button 144 is designated as auto replacement of the sub-assembly (e.g., given a specific color such as yellow) to show the user that he or she must replace the sub-assembly regardless of its condition.

Figure 20:
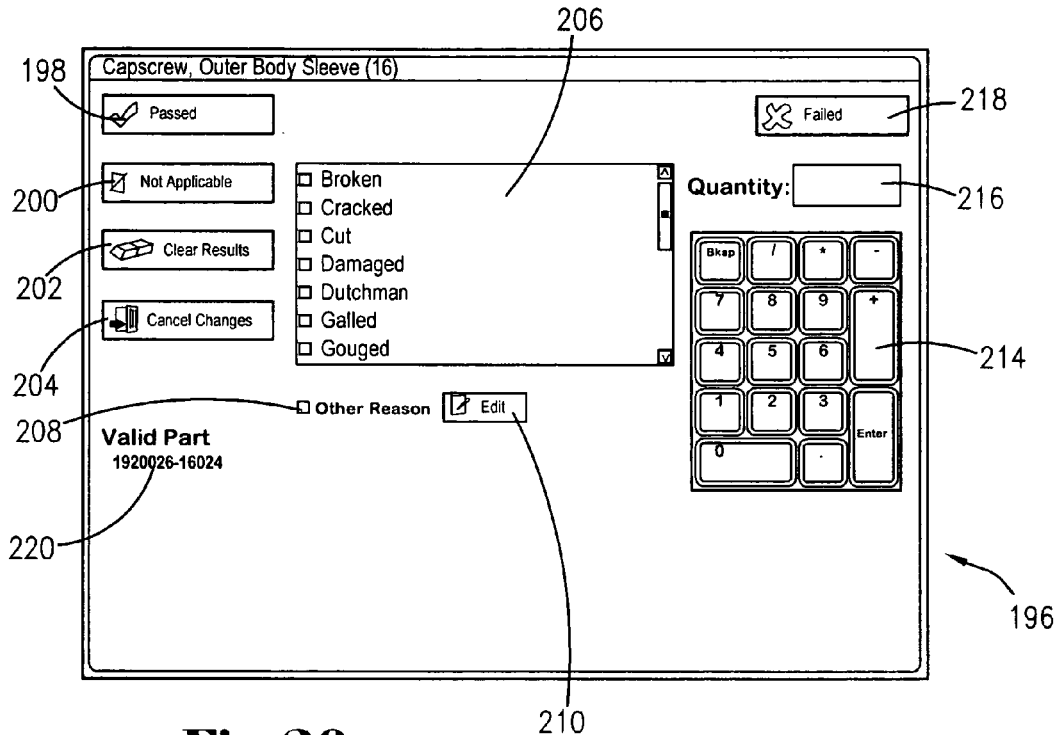
FIG. 20 is an embodiment of the inspection sub-assembly screen of the computer program.

When button 144 is clicked, the user is presented with an appropriate sub-assembly inspection interface that may be customized to the specific sub-assembly. For example, the interface may allow assigning OK or failure reasons, entering a numerical value/measurement or reading from an electronic inspection tool. These are non-limiting features as any number of features pertaining to a sub-assembly could be incorporated into button 144 or buttons 144 of sub-assembly list 146. FIG. 20 (described below) is one example of a sub-assembly interface.

Again with reference to FIG. 14, sub-assembly parts are numbered on item schematic 126, which numbers correspond to the numbers appearing in buttons 144 for the part. The parts on item schematic 126 are also color coordinated with corresponding buttons 144 such that when button 144 for a particular part is colored green (signifying that the part passed inspection), the part as shown in item schematic 126 will also be shown in green color. Likewise, if a part fails inspection both the part and the button 144 corresponding to the part will appear in the color red. The color association between the part and its corresponding button 144 functions for all the states mentioned above.

As shown in FIG. 15, inspection interface screen 108 contains time log tab 148. Tab 148 functions to allow the user to manage the personnel working on the inspection. Each user currently assigned or working on the inspection will be listed in tab 148. The first listed user will be the user who is currently logged into the system and who opened the inspection. The first user cannot be removed from the inspection. Each user will be shown with the time that he or she has been working on the inspection since being added (this is not a cumulative total, but only for the current session; for example, logging off and back on will start a new session and a new time counter being shown). All users other than the first user will have remove user button 152. Button 152 will, upon clicking, remove the associated user from the list of current users, indicating that he or she is done working on the inspection for this session. The removed user may always be added back later via add worker button 154. Button 154 allows a user to add himself or herself to the current inspection to indicate that the user is helping to perform the inspection. Clicking button 154 will bring up user login screen 58. Upon a successful login, the user will be added to the users listed on tab 148.

With reference to FIG. 16, admin tab 150, when activated, gives the user access to administrative functions for the particular inspection. Any user may access tab 150. But, the user may require managerial/supervisor approval to complete any actions within tab 150. Change job type button 156, when clicked, allows the user to switch between a basic (i.e., "Job-to-Job") and a complete (i.e., "Rework") inspection. If the user does not have supervisor/manager permission, the user will be shown managerial authorization required screen 158. If access is granted via the user entering the proper response to the challenge, then the operation will proceed as if the user is a supervisor; otherwise the screen is closed and no action is performed. If the user is a supervisor or permission is obtained from screen 158, then the inspection is changed to the alternate job type and the screen reloaded to reflect the changes. Delete worksheet button 160, when clicked, allows the user to cancel the current inspection and remove it completely from the system. This may be done when the user has opened the wrong tool for inspection or whenever the tool will be sent out to a third party to be inspected.

FIG. 17 provides an example of manager authorization required screen 158. Screen 158 is designed to ensure that the user has manager or supervisor approval before performing a "protected" action. Screen 158 will display challenge in challenge box 162 to the user which the user may read to a manager or supervisor. The manager/supervisor will use a manager authorization card report 288 (shown as FIG. 26) to read the proper response to the user. The response code is entered by the user and then the user's action is allowed to proceed. Screen 158 contains on-screen keypad 164 which the user may use to enter the response code in response code box 166 as given to him or her by the manager or supervisor. Authorize button 168 will attempt to authorize the user's input into the response field (against the challenge). If the response matches that required by the challenge then the form will close and the user's action will be authorized. If not, then a message is displayed for the user to try entering the code again. Cancel button 170 will stop the action requested and return to the previous screen.

Figure 18:
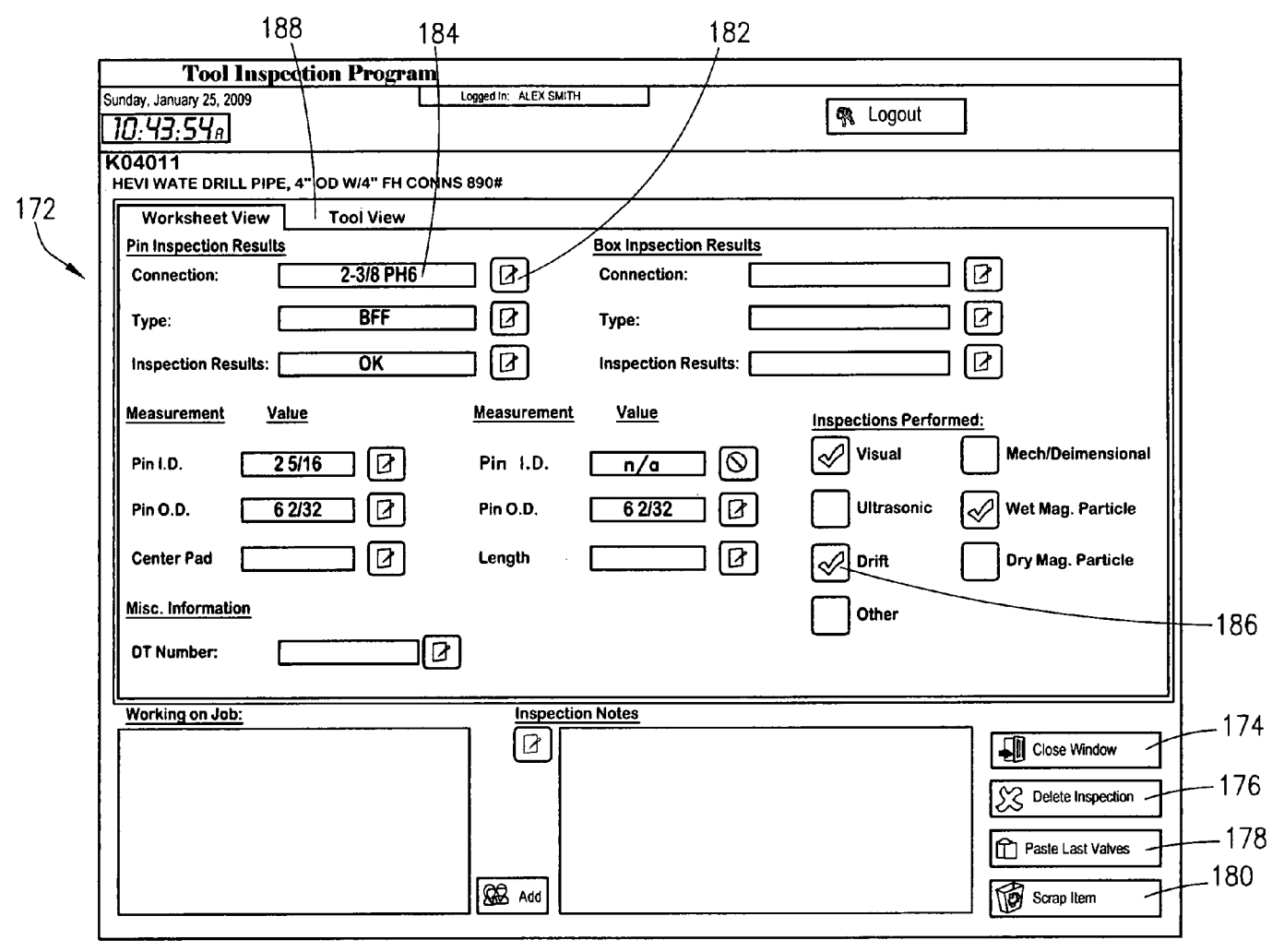

FIG. 18 shows alternative inspection interface screen 172. Screen 172 has a graphical user interface formatted to facilitate inspections that are primarily data entry such as for tubular inspection. The administrator configures the view most appropriate for the specific tool. Screen 172 contains close window button 174, which will close the screen without completing or closing the current inspection. This allows the inspector to move to his or her next inspection immediately. After closing, the user is returned to select item for inspection screen 78. Screen 172 includes delete inspection button 176. Button 176, when clicked, will delete the current inspection, permanently removing it from storage. Button 176 may be configured to require or not require managerial approval. Paste last values button 178, when clicked, permits the user to duplicate certain values from a previous inspection into the current inspection. This will allow for more rapid entry of inspections of similar items. The administrator may configure which values are allowed to be copied, but generally only properties not requiring physical inspection are copied (e.g., item types or the types of inspections performed). Screen 172 contains scrap item button 180, which when clicked, will flag the item as needing to be scrapped from inventory. In other words, the inspection of the item deems it unsuitable for future use. Button 180 will configure the inspection as scrapped in such a way that the user is not required to enter all values before closing the inspection out as the inspector would normally be required to do. Inspection sub-assembly buttons 182 function the same as sub-assembly buttons 144 from inspection interface screen 108. Buttons 182, when clicked, will display the appropriate sub-assembly inspection GUI for the associated sub assembly. The primary difference is that instead of adjusting colors to reflect the inspection results, the inspection results will be shown in input area 184 adjacent button 182. Sub-assemblies shown on screen which do not correspond to the current item being inspected will be disabled and grayed out. Inspection performed buttons 186 each represent a "check on complete" sub-assembly meaning that the user simply checks the box associated with button 186 to indicate that he or she performed that inspection. Clicking buttons 186 will change the value of that sub assembly and update to show (or hide) the checkmark indicator on button 186 itself. Tool view tab 188 permits the user to switch the view to inspection interface screen 108 by clicking on tab 188.

Figure 19:
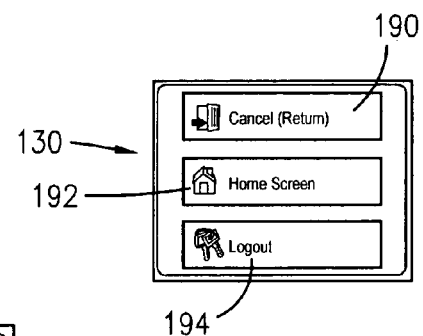
FIG. 19 is an embodiment of the logout options screen of the computer program.

Logout options screen 130 is represented in FIG. 19. Screen 130 allows the user to navigate from his or her current screen back to an initial application view—either entry screen 10 or the user's inspection home screen 74, 88. Screen 130 contains cancel (return) button 190. Button 190, when clicked, will cancel the user's logout request and allow him or her to continue using the program from the user's current location within the application. Clicking on home screen button 192 will return the user to inspection home screen 74, 88, keeping the current user logged into the application.

Should the user click on logout button 194, the user will return to entry screen 10, which will log the current user out of the system.

FIG. 20 illustrates an example of inspection sub-assembly screen 196. Screen 196 is designed to allow the user to enter the inspection results from a sub-assembly that is physically inspected (e.g., by visual, mechanical, or other inspection). All aspects of the inspection are configured on the schematic by the administrator such that elements shown on screen 196 may be turned on and off as appropriate for each individual sub-assembly. It is to be understood that screen 196 may differ depending on the specific item being inspected or which elements the administrator has selected for an item to appear on screen 196. For example, screen 196 may have passed button 198. Button 198, when clicked, allows the user to certify that the particular sub-assembly being inspected passed the inspection. Button 198 will be marked as "OK", saved and screen 196 closed. Screen 196 may include not applicable button 200. Button 200, when clicked, permits the user to certify that the particular sub-assembly does not apply to this particular part. The subassembly will be marked as "Not Applicable," saved and screen 196 closed. Screen 196 may also have clear results button 202. Button 202, when clicked, allows the user to clear any previously-saved results for the sub-assembly. Any previously saved inspection results will be cleared from storage and screen 196 closed. When cancel changes button 204 is clicked, the user is able to back out of the inspection of the subassembly without saving any inspection results. Screen 196 will be closed. Screen 196 includes failure reasons list box 206. Box 206 lists all of the failure reasons for the particular sub-assembly as assigned by the administrator via item schematic 126. This allows, for example, failure reasons specific to the material, type of sub-assembly or usage of the sub-assembly. When any failure reason is clicked by the user, it is selected and shown as such by a checkmark next to the reason description. If the user does not see the proper failure reason listed, the user may click on other reason checkbox 208 or edit button 210 in order to enter the failure reason in the user's own words. Clicking on checkbox 208 or button 210 will bring up other failure reason entry screen 212. If the administrator has indicated that the user must enter the quantity of the sub-assembly which has failed inspection, number pad 214 and quantity box 216 will be visible. An example of this usage might be if a part requires 10 bolts, the user must be able to indicate how many were damaged and needed repair. Any numbers typed into number pad 214 will appear in quantity box 216.

Again with reference to FIG. 20, screen 196 may include failed button 218. Clicking button 218 will allow the user to certify that the sub-assembly has failed inspection. Button 218 ensures that at least one reason for the failure of inspection was entered (either selected or entered as an "Other Reason"); if no failure reason was selected then the user will be informed of the need to select a reason on-screen. If the sub-assembly requires a quantity to be entered (as configured by the administrator) then the application will also ensure that a valid quantity was entered. If all data was entered/selected correctly, the sub-assembly will be marked as having failed inspection, the reasons and quantity saved and screen 196 closed. Part numbers display 220 shows any part numbers which are valid for the sub-assembly. Display 220 permits the user to easily obtain or re-order a part to use as a replacement/repair should the sub-assembly fail inspection. Multiple part numbers and options are supported, which are all entered by the administrator via the part schematic.

Figure 21:
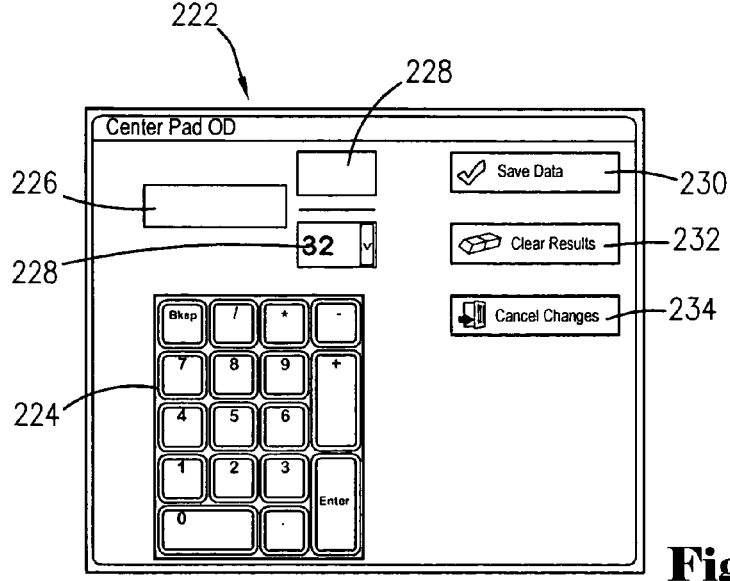
FIG. 21 is an embodiment of the numerical entry sub-assembly screen of the computer program.

FIG. 21 represents numerical entry sub-assembly screen 222. Screen 222 allows a user to enter an inspection that is simply a numerical amount. Examples may include inspections that consist of measurements, inspection equipment readings or physical properties. The administrator may setup, via the item schematic, the format for entry—integer, decimal or fraction (including fixing the denominator to a specific value or allowing the user to select the proper denominator). Screen 222 includes on-screen keypad 224. Keypad 224 permits the user to enter the value of the numeric expression. Any input via keypad 224 appears in either the integral box 226 or fractional input boxes 228. Input may be controlled by clicking in the appropriate box 226, 228 or by clicking the decimal point on keypad 224 to switch between the two. Clicking on save data button 230 will ensure that the user has entered all the required information (all parts of the number, if applicable). If information is missing, the user will be informed of this on screen 222; otherwise the data for the inspection is saved and screen 222 is closed. By clicking on clear results button 232, the user is able to clear any previously-saved data entered for the sub-assembly. All previously saved data results will be cleared from storage and screen 222 closed. Should the user click on cancel changes button 234, the user will be able to back out of the inspection of the sub-assembly without saving any changes. Screen 222 will close.

Figure 22:
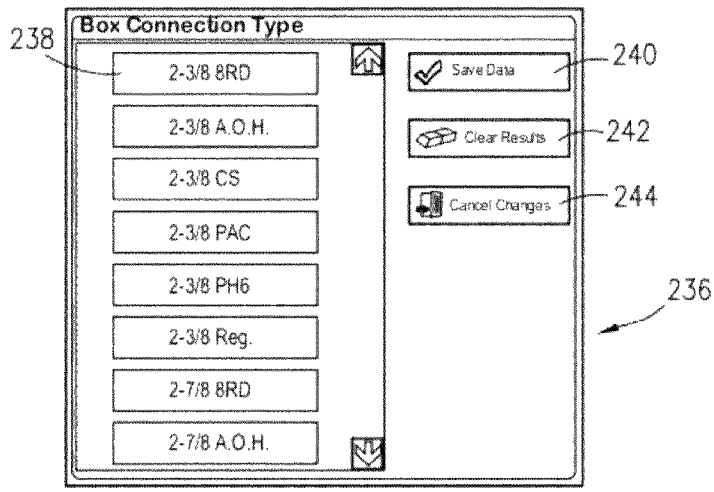
FIG. 22 is an embodiment of the option selection sub-assembly screen of the computer program.

FIG. 22 shows option selection sub-assembly screen 236. Screen 236 allows the user to enter an inspection that is done by choosing from a list of options. Any number and type of options may be configured by the administrator via the part schematic. Examples of use may be to select from a status list, a type list or a list of available results following a specific inspection. One selection button 238 will be shown per option that has been configured for the sub-assembly by the administrator. Any previously-selected option will be highlighted in a contrasting color in order to mark it as having been selected. The administrator may configure whether only one or multiple options may be selected. Clicking on any single item in a button 238 will select/highlight button 238 and double-clicking will select the option and automatically "click" save data button 240. Button 240 ensures that the user has selected at least one option from the list of available choices. If a selection is missing, the user will be informed of this on screen 236; otherwise the choice(s) for the inspection is saved and screen 236 closed. By clicking on clear results button 242, the user is able to clear any previously-saved data entered for the sub-assembly. All previously saved data results will be cleared from storage and screen 236 closed. By clicking on cancel changes button 244, the user is able to back out of the inspection of the sub-assembly without saving any changes. Screen 236 will be closed.

Figure 23:
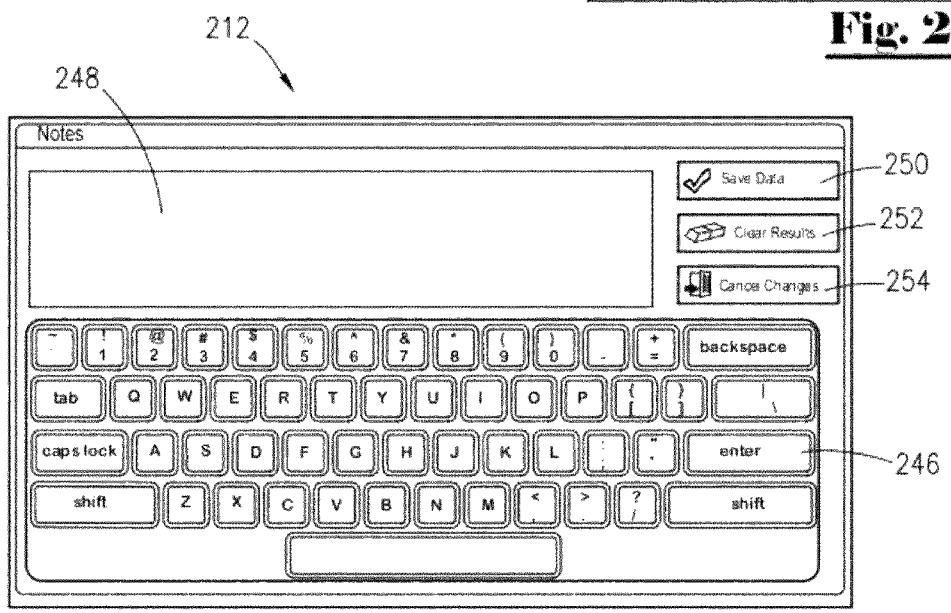
FIG. 23 is an embodiment of the text entry sub-assembly/other failure reason entry screen of the computer program.

FIG. 23 reveals text entry sub-assembly/other failure reason entry screen 212, which is used in multiple places in the application as a way to enter free-form text via an onscreen keyboard. The two prime examples are for "Other" failure reasons where the user must type in reasons for the failure and for inspection sub-assemblies designed to allow the user to add notes to an inspection. On-screen keyboard 246 may be used for data entry. All keys pressed are passed into text area 248. When clicked, save data button 250 will save the user's input either to a notes inspection sub-assembly or into the "Other" failure reason field. Screen 212 will then close. Clear results button 252, when clicked, will remove all text that has been input into text area 248, save the changes as if the user had clicked save data button 250, and close screen 212. By clicking on cancel changes button 254, the user is able to back out of screen 212 without saving any changes made to the text. Screen 212 will close.

Figure 24:
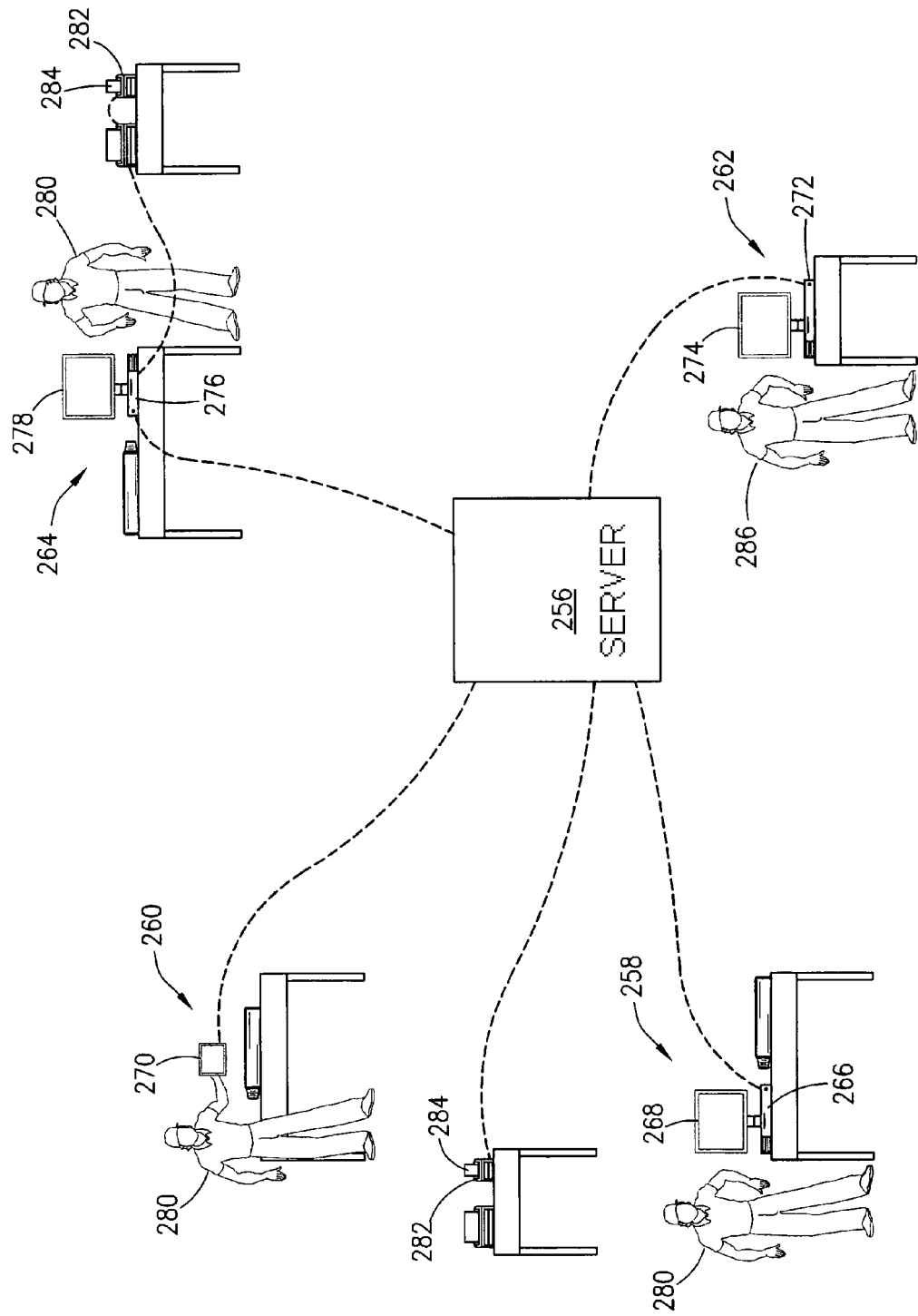
FIG. 24 is a schematic diagram of the hardware used as part of the method of the present invention.

FIG. 24 illustrates an example of the hardware associated with the present invention. The program is stored on server 256. While server 256 is shown, the program could be stored on any type of computer storage device such as a CPU. The hardware includes workstation 258, 260, 262, and 264. Workstation 258 is an inspection station located in an on-site facility and includes hard-drive 266 and operatively connected computer touch-screen 268. Workstation 260 is an inspection station also located in the on-site facility and includes hand-held device 270, which may be a hand-held PC. Workstation 262 is an administrator station located on-site and includes hard-drive 272 and computer display screen 274, which may be a touch-screen. Workstation 264 is an inspection station located in an off-site facility and includes hard-drive 276 and computer touch-screen 278. The computers at workstations 258, 260 and 264 are configured for use by inspectors 280. The computer at workstation 262 is configured for use by authorized administrator 286 such as a manager or supervisor. Full access to the program is available to the administrator at workstation 262. The computers at workstations 258, 260 and 264 (i.e., hard-drive 266, hand-held device 270, and hard-drive 276) may be operatively connected (e.g., via the network) to respective label printers 282 for printing inspection label 284 generated at the close of an inspection. Although not shown, workstations 262 may also have one or more printers operatively connected therewith for printing inspection labels or reports. Through server 256, workstations 258, 260, 262, 264 and printer 282 may be networked. The network may be networked via hardwire, wireless, internet or other network configuration. It is to be understood that the hardware representation of FIG. 24 is an exemplar, other hardware, workstations and printers may be used as part of the system both in-site and off-site.

FIG. 25 illustrates an example of inspection label 284 that is printed by the program upon the successful completion of the inspection of an item or tool. A printer configured to the inspection application (such as label printer 282) prints label 284. The user may then affix label 284 to the tool which passed inspection. Label 284 may contain any item of information desired by the administrator such as company information, item serial number, inspection number, description of item, inspection date, inspector name, print date, and a bar code. The bar code may contain all of the aforesaid information and any other the administrator wishes to encode.

One of the many advantages of the method and program of the present invention is the capability to create a database of inspection information (e.g., inspection results for specific tools), track the information in the database, and generate reports based on the information. For example, the program is able to generate inspection report 290 as shown in FIG. 27. Report 290 represents the complete results of a specific inspection, showing in detail the results of the inspection of all sub-assemblies for a tool as well as a graphical representation of the inspection as a whole. Report 290 may be used as the official hard-copy of an inspection. Report 290 may only be generated via a manager web application accessible from hard-drive 272. Users may be given explicit permission to run reports against tools or may be restricted to viewing inspection from their own locations. Schematic view 292 is a graphical representation of the schematic results. Sub-assemblies are high-lighted or colored in yellow (signifying auto-replace), green (signifying inspection okay), or red (signifying inspection failure). The viewer is therefore given a quick overview of the inspection results. Right column 294 provides detailed information on all sub-assemblies including name, results of inspection (including failure reasons if any), and name of user who performed the inspection.

FIG. 28 shows an example of inspection report—datasheet view 296. Report 296 represents the complete results of an individual inspection or inspections; however, report 296 presents the data in a pre-defined columnar format. It is designed to be used on inspections where the schematic need not be viewed and is usually tied to inspections done using inspection interface—datasheet view screen 172. Report 296 may be generated via touch screen application by selecting print open inspections button 90 on alternative inspection home screen 88. When generated in this fashion, the program will pull up all of the inspections which the user has opened, but not yet closed/completed. Alternatively, a user may pull up report 296 via the manager web application; in this instance report 296 may be run for a single inspection or multiple inspections with the criteria selected by the user. Report 296 displays the results of specific sub-assemblies in a columnar format with each line in the report corresponding to an individual inspection. The information contained in each column is the result of the inspection, normally a value or selection of failure reason. If a particular item does not contain a sub-assembly for a given column, that column is left blank. Any sub-assemblies on an item which do not correspond to a column in report 296 are omitted from printing.

FIG. 29 illustrates damages by DT report 298. Report 298 allows authorized users to retrieve the results of inspections for all items rented under a single delivery ticket (a specific invoice or transaction). Report 298 may only be generated via the manager web application. Users may be given explicit permissions to run report 298. Report 298 will list all of the tools/rentals associated with a given delivery ticket and provide the following items of information: (1) tools on the DT which may not be inspected by the program; (2) tools on the DT which are inspected by the program but which have not yet been inspected; and (3) tools on the DT which have been inspected by the program and which show no failed inspections or damages; (4) tools on the DT which have been inspected by the program and do show failed inspections or damages. In this case, the list of damages assigned by the inspector will be listed for the tool.

FIG. 30 shows labor report 300. Report 300 produces a list of inspectors who worked on a particular inspection, showing the dates and times that he or she spent on the particular tool. Report 300 is designed to allow managers to review the amount of time spent by tool and by employee. Report 300 may only be generated via the manager web application. Users may access this report for any inspection for which inspection report 290 is viewable. Report 300 pulls the user logs for the inspection, showing each inspector and the start/stop time for each session on the particular inspection. Start and stop times are calculated as the times during which the user is logged into the system and the particular inspection was open.

The program is capable of generating others reports. For example, stats report which retrieves overall system statistics that may be used to manage the system at a macro level. The stats report may include the number of inspections performed per location, per user, on a particular machine, or inspections attempted for which the item was not supported in the program. The program may also generate a parts usage report which lists all of the parts which were marked as failures (failed inspection) and thus required replacement on tools. The parts usage report allows for parts inventory management and replenishment. Reports may also be run to track trends of failures, e.g., the most-failed parts, the most-selected reasons for failures or the most often damaged tool. This allows strategic planning of resources and preventative measures to be taken to better avoid damages and failures in the future.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

What is claimed is:

1. A method of inspecting equipment to ensure quality control, comprising the steps of:
   (a) providing a piece of equipment in need of an inspection;
   (b) logging into a computer program, the program assisting in the inspection of the equipment;
   (c) entering an identification data associated with the equipment into the program and displaying on a display screen an inspection protocol adapted to the equipment, wherein the inspection protocol comprises a graphical representation of the equipment and an inspection protocol screen, the inspection protocol screen comprising a plurality of component inspection protocols, each component inspection protocol corresponding to a specific component part of the equipment depicted in the graphical representation, and wherein each of the component inspection protocols has a plurality of inspection states corresponding to a status of the inspection;
   (d) carrying out the inspection of the equipment by following the inspection protocol; and
   (e) closing the inspection protocol upon completion of the inspection, wherein the inspection protocol is prevented from closing unless the inspection protocol has been followed in it entirety.

2. The method according to claim 1, wherein the identification data is a serial number associated with the equipment.

3. The method according to claim 1, wherein the display screen is part of a computer monitor.

4. The method according to claim 1, wherein the display screen is part of a hand-held device.

5. The method according to claim 1, wherein the display screen is a touch-screen.

6. The method according to claim 1, wherein the equipment is a tool used in the exploration or production of a hydrocarbon.

7. The method according to claim 1, wherein the program is stored on a network server.

8. The method according to claim 7, wherein the display screen is part of a computer that is networked to the server.

9. The method according to claim 1, further comprising the step of:
   (f) accessing the program to display on the display screen a resource data.

10. The method according to claim 9, wherein the resource data is selected from the group consisting of technical information about the equipment, a procedure for inspecting the equipment and an inspection training video.

11. The method according to claim 1, wherein the graphical representation of the equipment comprises a schematic or diagram of the equipment.

12. The method according to claim 11, wherein the schematic or diagram is an exploded view of the equipment, the exploded view showing all component parts of the equipment.

13. The method according to claim 11, wherein the plurality of inspection states include a state indicating that the component part has not been inspected, a state indicating that the component part has passed inspection, a state indicating that the component part has failed inspection, a state indicating that inspection of the component part is not applicable, and a state indicating that the component part must be replaced.

14. The method according to claim 13, wherein each inspection state has an associated color to signify the inspection state, each of the component inspection protocols being displayed in the color of a then-current inspection state of the component.

15. The method according to claim 14, wherein each component part of the equipment depicted in the schematic or diagram is displayed in the color of its corresponding component inspection protocol.

16. A method of inspecting equipment to ensure quality control, comprising the steps of:
   (a) providing a piece of equipment in need of an inspection;
   (b) logging into a computer program from a computer having a touch-screen display, the program assisting in the inspection of the equipment;
   (c) entering an identification data associated with the equipment into the program and displaying on the touch-screen display an inspection protocol adapted to the equipment, wherein the inspection protocol comprises a graphical representation of the equipment and an inspection protocol screen, the inspection protocol screen comprising a plurality of component inspection protocols, each component inspection protocol corresponding to a specific component part of the equipment depicted in the graphical representation, and wherein each of the component inspection protocols has a plurality of inspection states corresponding to a status of the inspection;
   (d) carrying out the inspection of the equipment by following the inspection protocol; and
   (e) closing the inspection protocol upon completion of the inspection, wherein the inspection protocol is prevented from closing unless the inspection protocol has been followed in it entirety; and
   (f) printing an inspection label upon the closing of the inspection protocol and associating the inspection label with the inspected equipment.

17. The method according to claim 16, further comprising the steps of:
   (g) carrying out repeated inspections of a plurality of equipment employing steps (a) through (e);
   (h) generating a database based on a plurality of inspection data compiled from the inspection of the plurality of equipment;
   (i) generating a report based on the database.

18. The method according to claim 17, wherein access to the report is restricted to an authorized person.

19. The method according to claim 17, where the reports are selected from the group consisting of an inspection report, a damage report, a labor report, a system statistic report, a parts usage report, and a trend failure report.

* * * * *